(12) United States Patent
Lawrence et al.

(10) Patent No.: US 10,666,946 B2
(45) Date of Patent: May 26, 2020

(54) METHOD AND SYSTEM OF VIDEO CODING USING DISPLAY MODIFICATION INPUT

(71) Applicant: Intel Corporation, Santa Clara, CA (US)

(72) Inventors: Sean J. Lawrence, Bangalore (IN); Frederic J. Noraz, Gattieres (FR); Jill M. Boyce, Portland, OR (US); Sumit Mohan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 15/282,508

(22) Filed: Sep. 30, 2016

(65) Prior Publication Data

US 2018/0007365 A1    Jan. 4, 2018

Related U.S. Application Data

(63) Continuation-in-part of application No. 15/201,227, filed on Jul. 1, 2016.

(51) Int. Cl.
| | |
|---|---|
| *H04N 19/139* | (2014.01) |
| *H04N 19/105* | (2014.01) |
| *H04N 19/172* | (2014.01) |
| *H04N 19/176* | (2014.01) |
| *H04N 19/182* | (2014.01) |
| *H04N 19/162* | (2014.01) |
| *H04N 19/51*  | (2014.01) |
| *H04N 19/17*  | (2014.01) |
| *H04N 19/164* | (2014.01) |
| *H04N 19/20*  | (2014.01) |

(52) U.S. Cl.
CPC ......... *H04N 19/139* (2014.11); *H04N 19/105* (2014.11); *H04N 19/162* (2014.11); *H04N 19/164* (2014.11); *H04N 19/17* (2014.11); *H04N 19/176* (2014.11); *H04N 19/20* (2014.11); *H04N 19/51* (2014.11)

(58) Field of Classification Search
CPC .............. H04N 21/812; H04N 19/172; H04N 21/4312; H04N 7/17318; H04N 19/176; H04N 21/23424; H04N 19/139; H04N 19/61; H04N 19/159; H04N 21/2407; H04N 21/26616; H04N 21/4402; H04N 19/51; H04N 19/577; H04N 19/105; H04N 19/17; H04N 19/182; H04N 19/503; H04N 19/00; H04N 19/44; H04N 19/70; H04N 19/107; H04N 19/573; H04N 19/46; H04N 19/527; H04N 13/344; H04N 19/162; H04N 13/398
See application file for complete search history.

(56) References Cited

U.S. PATENT DOCUMENTS

| | | | |
|---|---|---|---|
| 5,532,715 A | | 7/1996 | Bates et al. |
| 5,708,845 A | * | 1/1998 | Wistendahl ....... G06F 17/30014 |
| | | | 348/E5.108 |

(Continued)

OTHER PUBLICATIONS

Office Action for U.S. Appl. No. 15/201,227, dated Oct. 18, 2018.

*Primary Examiner* — Dave Czekaj
*Assistant Examiner* — Kehinde Abimbola
(74) *Attorney, Agent, or Firm* — Green, Howard & Mughal LLP

(57) ABSTRACT

Techniques described herein are related to video coding using display modification input.

25 Claims, 10 Drawing Sheets

(56) References Cited

U.S. PATENT DOCUMENTS

| | | | |
|---|---|---|---|
| 5,973,663 | A | 10/1999 | Bates et al. |
| 6,169,573 | B1* | 1/2001 | Sampath-Kumar ............... G06F 17/30017 348/169 |
| 6,496,981 | B1* | 12/2002 | Wistendahl .......... G11B 27/034 345/619 |
| 7,577,978 | B1* | 8/2009 | Wistendahl ............. A63F 13/12 725/109 |
| 7,991,053 | B2 | 8/2011 | Raveendran |
| 9,467,659 | B2 | 10/2016 | Raveendran |
| 2002/0056136 | A1* | 5/2002 | Wistendahl ....... G06F 17/30017 725/135 |
| 2003/0081850 | A1 | 5/2003 | Karczewicz et al. |
| 2005/0265461 | A1 | 12/2005 | Raveendran |
| 2007/0071398 | A1 | 3/2007 | Raveendran et al. |
| 2008/0204592 | A1* | 8/2008 | Jia ........................ G06T 3/4007 348/402.1 |
| 2009/0274434 | A1 | 11/2009 | Mei et al. |
| 2011/0091122 | A1* | 4/2011 | Park ...................... H04N 19/56 382/239 |
| 2012/0027259 | A1* | 2/2012 | Bruijns .................... G06T 7/30 382/103 |
| 2014/0098886 | A1 | 4/2014 | Crenshaw et al. |
| 2014/0289241 | A1 | 9/2014 | Anderson |
| 2015/0078445 | A1 | 3/2015 | Wang et al. |
| 2015/0195566 | A1 | 7/2015 | Hinz et al. |
| 2015/0346984 | A1 | 12/2015 | Flint et al. |
| 2016/0330469 | A1* | 11/2016 | Amer .................... H04N 19/105 |
| 2017/0324973 | A1* | 11/2017 | Tanner ................. H04N 19/176 |
| 2017/0359588 | A1* | 12/2017 | Tanner ................. H04N 19/186 |

\* cited by examiner

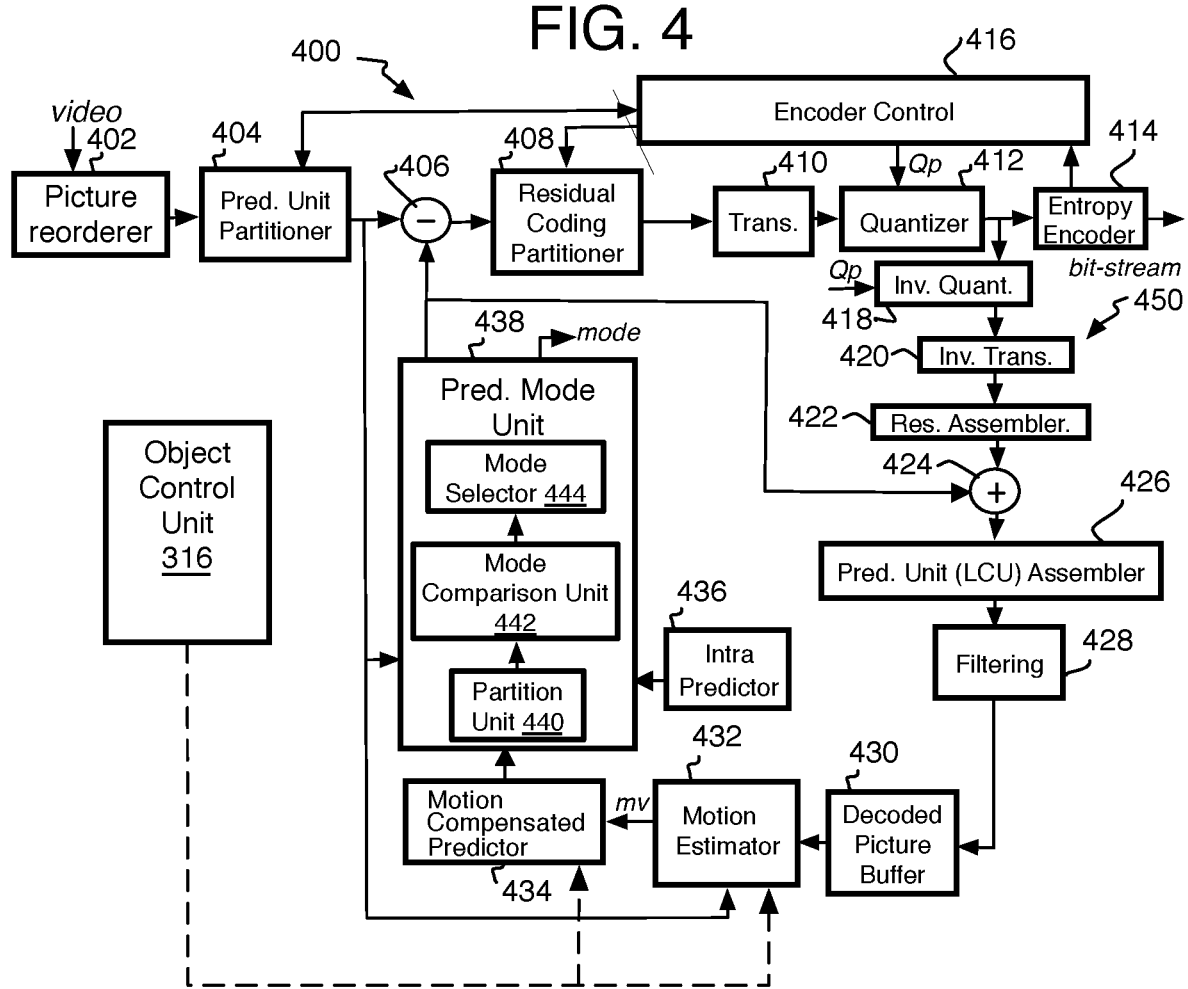
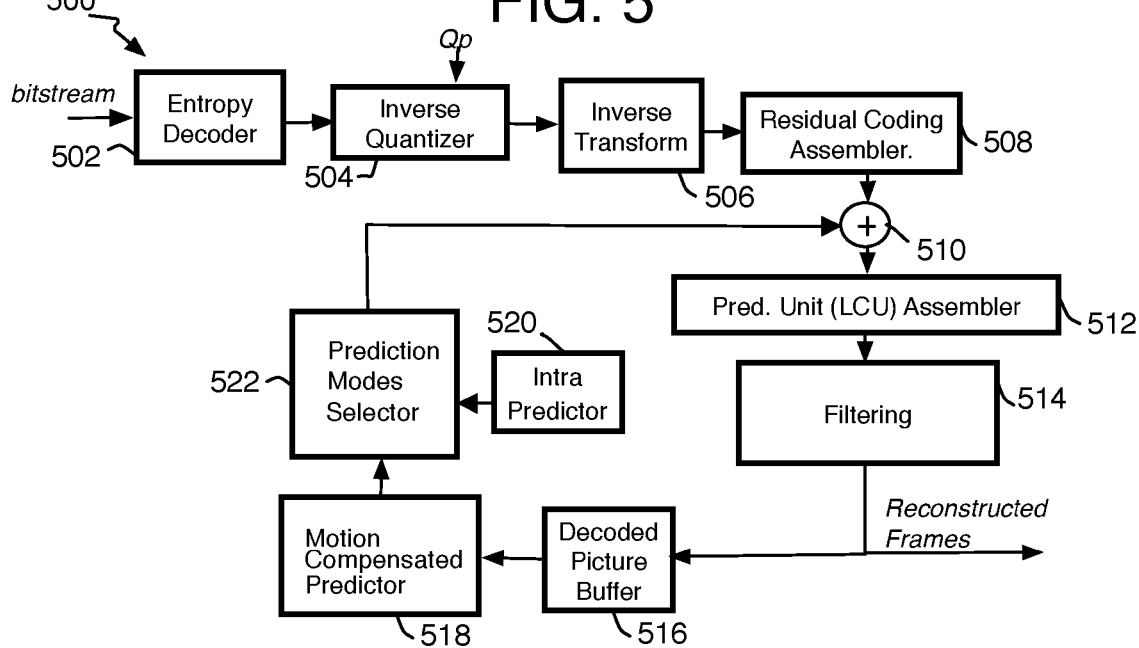

OBTAIN TEMPORAL DISPLAY CONTENT INFORMATION OF IMAGE DATA OF FRAMES OF A FRAME SEQUENCE AND COMPRISING OBJECT DATA OF AT LEAST ONE OBJECT BEING MOVED FROM FRAME TO FRAME DUE TO USER OR AUTOMATIC INPUT TO AN APPLICATION PROVIDING THE TEMPORAL DISPLAY CONTENT INFORMATION, WHEREIN THE AT LEAST ONE OBJECT IS DEFINED BEFORE ENCODING AND FOR AT LEAST ONE REASON THAT IS NOT SOLELY FOR ENCODING
602

OBTAIN PIXEL IMAGE DATA OF THE FRAMES TO ENCODE THE FRAME SEQUENCE
604

DETERMINE AT LEAST ONE MOTION VECTOR ASSOCIATED WITH THE AT LEAST ONE OBJECT BASED, AT LEAST IN PART, ON THE TEMPORAL DISPLAY CONTENT INFORMATION
606

METHOD AND SYSTEM OF VIDEO CODING USING DISPLAY MODIFICATION INPUT

REFERENCE TO RELATED APPLICATION

This patent application is a continuation-in-part of pending U.S. patent application Ser. No. 15/201,227, filed Jul. 1, 2016, titled "Method and System of Video Coding Using Content Based Metadata", which is incorporated herein for all purposes.

BACKGROUND

Due to ever increasing video resolutions, and rising expectations for high quality video images, a high demand exists for efficient image data compression of video while performance is limited for coding with existing video coding standards such as H.264, Advanced video coding (AVC), or H.265/HEVC (High Efficiency Video Coding), and other video coding standards. The aforementioned standards use expanded forms of traditional approaches to address the insufficient compression/quality problem, but often the results are still insufficient and require a large amount of energy to compute the results.

The conventional video coding processes use inter-prediction at an encoder to reduce temporal (frame-to-frame) redundancy. This is accomplished by first performing motion estimation to determine where the same or similar image data has moved between a reference frame and a current frame being analyzed. The frames are often partitioned into blocks, and the motion is represented by a motion vector that indicates where a block has moved from frame-to-frame. Motion compensation is then performed to apply the motion vector to construct a prediction block for a current frame to be reconstructed. A prediction mode selector then compares candidate predictions including those from the inter-prediction and other techniques such as intra-prediction to determine a best prediction mode for a block. For the selected best prediction mode, the difference in image data of a block between the prediction and real (original or actual) data is called the residual data and is compressed and encoded together with the motion vector when inter-prediction is selected as the best prediction mode.

Motion estimation often includes a search on a reference frame for one or more blocks that match a block being analyzed on the current frame. The searching is very computationally intensive when a large number of pixels over a wide area of a screen or frame require such searching. In order to limit brute searches, a motion vector previously determined on one or more spatial neighbor blocks may be used to determine a motion vector on a current block on the same frame. Since a block is relatively small compared to the size of a screen, however, from 64×64 bits to 4×4 bits depending on the standard, this still is very computationally heavy. Thus, these motion vector determining techniques consume a large amount of memory bandwidth and power, especially when large areas of a frame require such motion estimation techniques.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 4 is a schematic diagram of an example encoder for an image processing system;

FIG. 5 is a schematic diagram of a decoder for a video coding system;

FIG. 6 is a flow chart of a method of video coding using display modification input according to the implementations herein;

DETAILED DESCRIPTION

Figure 1:
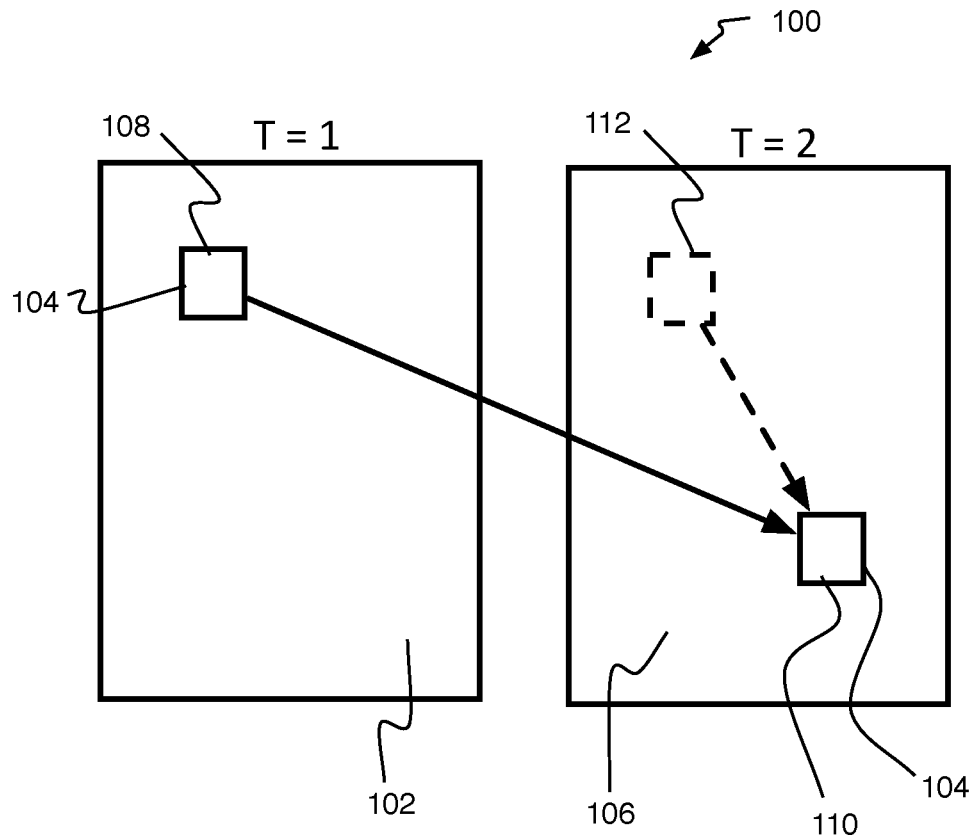
FIG. 1 is a schematic diagram showing an object moved from one position in one frame to another position in another frame by display modification input.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, mediums, and methods are described below related to video coding using display modification input according to the implementations herein.

In the field of video encoding, the memory bandwidth and power required to encode video frames is directly related to the number of pixels per frame, the frame rate, and the encoder settings. Regarding the encoder settings, it is further known that the motion estimation and mode decision functions for inter-prediction are some of the most computationally intensive tasks. Specifically, in inter-prediction, the motion of a block of image data from one frame to another frame in a video or frame sequence is determined in a number of different ways. One is brute force block matching that searches a reference frame for a block that matches a block on a current frame, and the difference in position (or offset) between the blocks is a motion vector (MV). The MV is then used to compute a prediction of image data for the current block, and this prediction may be one alternative prediction of a set of alternative candidate predictions provided to a prediction mode selector that selects the best prediction. Depending on the coding standard used such as HEVC, the prediction mode selector may compare different alternative candidate predictions that are based on different block sub-divisions of the same main coding unit or coding tree unit block where each alternative may be using at least some different motion vectors. The selected prediction is used to generate a residual (the difference between original image data and the predicted image data of the current block) which is then compressed and transmitted to a decoder. Some alternative strategies use previously generated MVs of other spatial neighbor blocks on the same frame as the current block to compute the MV of the current block. As mentioned, the relative amount of computations and time to determine the MVs and to make the mode selection can be very large in order to achieve high compression gains which consumes a large memory bandwidth as well as power, especially when the inter-prediction computations are applied to a relatively large section of pixels in a frame. These disadvantages are particularly troublesome for mirroring, personal area networks (PANs), or wireless docking that wirelessly transmit from a smartphone or other small battery-powered computing device to a large screen display where reduction of encoding computations and power consumption is very important.

To resolve these issues, a method and system are derived to eliminate or reduce the area on a reference frame that is searched to find a reference block matching a current block on a current frame in order to reduce the computational load to generate motion vectors. This is accomplished by using knowledge of the content of the frames obtained previously to the encoding of the frames. Particularly, many computer programs or applications that use a display of images as part of the program permit a user viewing the images to move objects on the image. Other times, an application may move objects on the image automatically (referred to as automatic input herein) in response to certain activating events including in response to a user's input. The application may define the objects and their positions, and perform (or more precisely initiate the performance) of the movement of the objects. The computer operating system (OS) receives the image data regarding the motion of the object and then uses that data to display the motion of the object on a local display or screen.

This object motion data also can be used when the frames are to be encoded and transmitted to another device to display the frames at a remote display. This may occur in a number of different situations particularly relevant here where a user is performing tasks on an application where transmitting the screen shots of a local screen to another device is desirable. This may occur on short range mirroring networks or PANs that display images on a computer such as a laptop, smartphone, and/or tablet before transmitting them to a nearby large television for group viewing, entertainment, clarity of the image content, and so forth. Otherwise, any computer with its own display on the same network as an encoder, decoder, and the decoder's display can be used to display the images on the encoder side (or analyze the images as though they were to be displayed on the encoder side) before transmitting them to one or more people where images need to be shared for example. In these situations, the computer transmitting the image content may or may not be in the same room as the meeting, such as with a webinar type of situation, where each person may have a computer with a decoder and a display. Many different examples are possible. It will be appreciated that herein video includes a frame sequence of images based on screen shots of a computing device and is not limited to recorded video obtain by using a camera.

In these situations where the content of a frame sequence is displayed at the source, usually without first being compressed and decompressed, it may occur before encoding and transmitting the frame sequence to be displayed on another device. An application that receives or generates object motion data or the OS that is displaying the image data for the application may be able to provide the dimensions of the object as well as the position of the object as the object moves from frame to frame.

Conventionally, image data of a frame sequence would be passed on to the encoder without using content information. The method and system herein, however, recognize the importance of this content information, and use the content information to at least reduce the amount of motion estimation computations needed to be performed to generate a motion vector. This is accomplished by providing the object dimensions and motion data to the encoder so that the motion vectors for the area of a frame forming the object can be generated with substantially reduced search computations and time if not eliminated altogether. The result of these methods using content information for an image to be encoded is to reduce the amount of pixels to be searched in full brute force searches, and reduce the amount of computations for other types of computationally heavy motion vector generation, for motion estimation. This enables significant reduction in power and time for encoding a frame sequence.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

Referring to FIG. 1, a frame sequence 100 demonstrates the object motion concept and includes a frame 102 at time T=1 with a predefined object 104 at a first position 108. Predefined here refers to defined before providing the image data to an encoder, or by one form, at least before any processing that is performed solely for encoding. In other words, the object 104 is defined for at least one reason that is not just solely for encoding. This can be many different things for many different display applications other than object detection solely for encoding efficiency for example. Such display applications may include graphics programs such as games, presentation, and drawing programs (whether artistic or computer aided design (CADs)), or other types of programs such as word processors and document display programs (such as PDF type), spread sheets, databases, web browsers, or any other specific industry, service, business, educational, media, or communications applications that present images whether graphics or information on a display where it is desirable to transmit the screen shots of the display to a remote display and where objects are moved either manually or automatically on the display. The objects that are moved could be text.

Continuing with the example, a frame 106 at T=2 may be the current frame that holds a present position 110 of the object 104. The frames 102 and 106 may or may not be consecutive frames but are in chronological order (frame 102 precedes frame 106). The solid arrow shows the motion of object 104 from frame to frame. The dashed arrow shows the actual motion of the object 104 on a frame and from a position 112 that is the same as position 108. The motion of the object 104 from position 108 to position 110 could be for many different reasons as explained below. Thus, it also will be understood that the object may be moved from an initial position to a final position over a large number of frames. The operating system herein, however, typically needs to break down such motion into consecutive frame to frame portions in order to display the images and the moving object locally. Thus, moving an object from a first position to a second position herein will usually refer to a consecutive frame to frame motion unless the context suggests otherwise, and even though such motion may be only a small part of the complete motion of an object.

Figure 2:
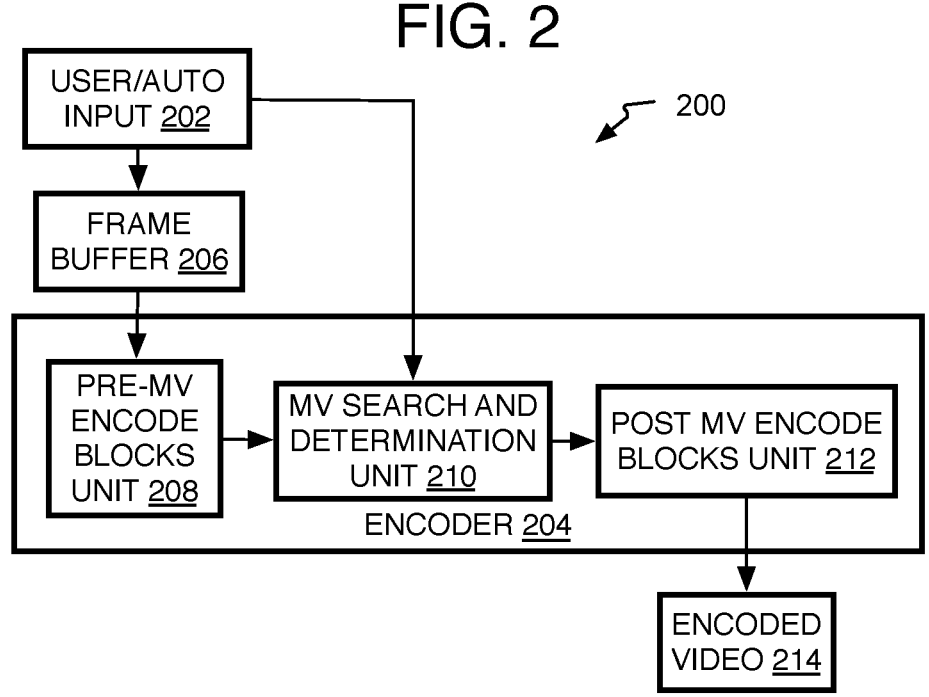
FIG. 2 is a schematic diagram of an image processing system in accordance with the implementations herein.

Referring to FIG. 2, one example image processing device 200 is provided to explain the general implementation of the methods disclosed herein and may have a user/auto input unit 202. By one of many possible examples, the user input may include a user using an interface such as a mouse to move a cursor over a predefined object, say a process box on a flow chart on a slide presentation program where the user desires to move the box on a screen of a display. The user then may click on the object to select that object with a mouse button. The user then holds down the mouse button while dragging the object by sliding the mouse until the object is placed at the desired position on the display, and then the user releases the mouse button. This is but one possible example of a user input and others are mentioned below. The initial position of the object as well as a number of intermediate positions until a final position is reached each may be on a frame of a frame sequence being used by the OS to display the motion of the object.

As an example of automatic input, a user may be playing the computer on a chess game displayed on a computing device. In this example, during the user's turn, the user provides a user input as just described to move a chess piece. During the computer's turn, however, the chess application computes a move, possibly in response to the user's move, and once computed implements the display of the move showing a chess piece that is moved from one location to another location on the display of a chess board (this may or may not include displaying the sliding of the chess piece from one position to another—it just may disappear at the old location and appear at the new location). Whether the input is the user's input or the automatic input, the chess application has a predefined object (the chess piece) with predefined positions and predefined dimensions. Thus, the motion from one location to another including the distance and direction are known to the application and provided to the OS to locally display the motion of the objects. Many other examples are possible whether in games, business type programs, or others.

The motion data then may be saved to provide it to an encoder 204 while the display, in the form of frames, are placed in an input frame buffer 206 to provide frames to the encoder 204. The encoder 204 may have pre-MV encode blocks 208 that may include pre-processing units that prepare the frames for encoding, partitioning of frames, and all other encoding operations including determination of residuals, DCT transforming, quantization, and the beginning of the decoder loop at the encoder, include the inverse and frame reconstruction to build reference frames, filtering and so forth. The encoder 204 also may have an inter-prediction capability provided by a MV search and determination unit 210 that receives image data of reference frames and a current frame, and then performs motion estimation to match blocks (partitions) of the current frame to blocks on one or more of the reference frames. Once the blocks are matched, the motion vectors that represent the matches are provided to post MV encode blocks that perform motion compensation to provide predictions based on the motion vectors, and then residuals for compressing by DCT transform, quantization, and entropy coding before being placed in an encoded video 214 to be transmitted.

According to the implementations herein, the MV search and determination unit 210 of the encoder 204 may obtain object data regarding motion of an object put into motion by display modification input. The object data at least indicates the beginning and end of the motion of the object (the first and second positions) for consecutive (or some other interval) frames. The object data also may include the dimensions of the object. Depending on the precision of the dimensions of the object, if provided at all, the search for matching blocks to generate motion vectors can be modified to reduce the computational load of the motion vector generation or eliminated altogether. More details are provided below.

Figure 3:
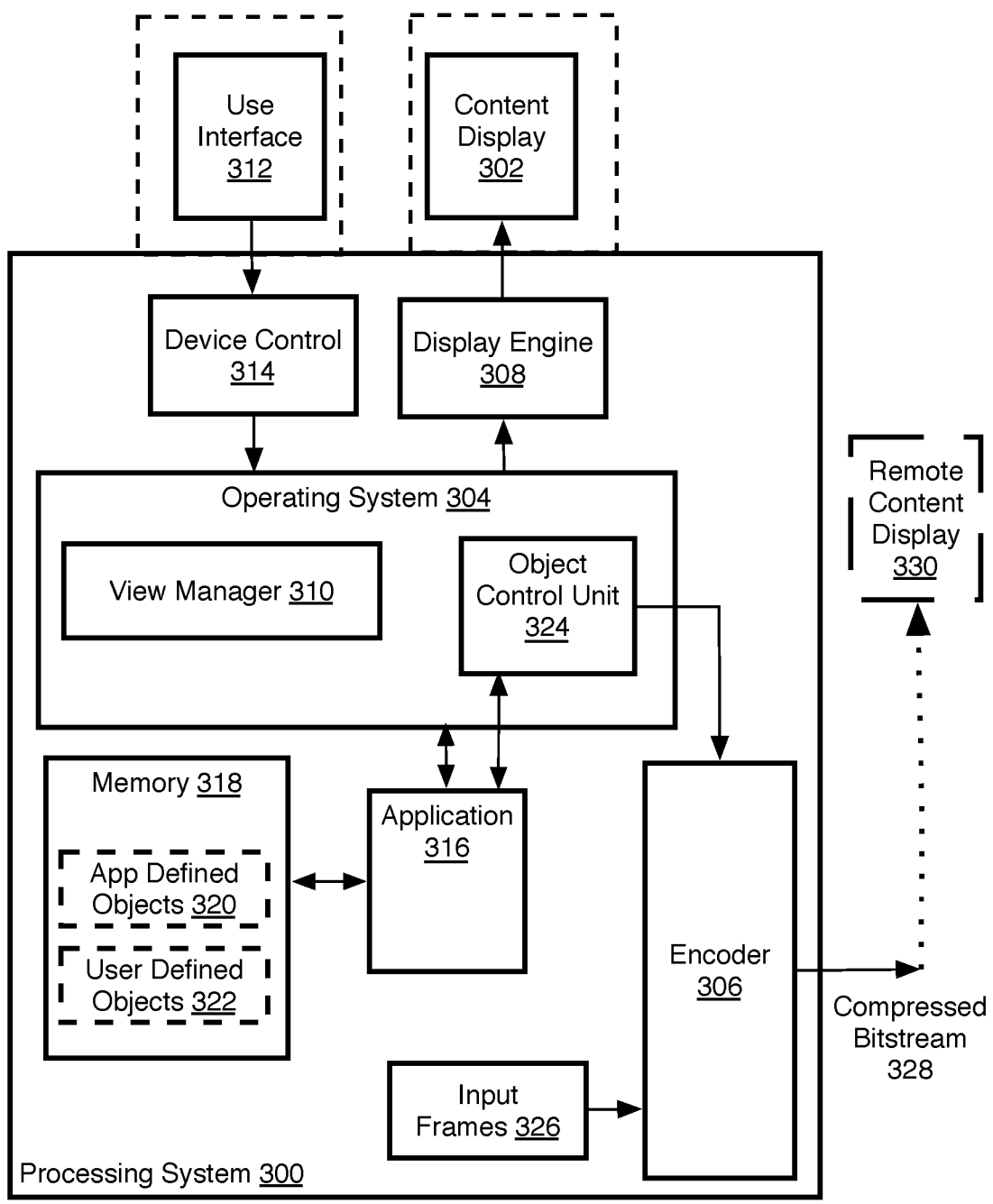
FIG. 3 is a schematic diagram of a processing system in accordance with the implementations herein.

Referring now to FIG. 3, an example processing system 300 is provided that has both a display 302 operated by an operation system (OS) 304 to locally display visual content including images, video (or frame) sequences, and so forth, and an encoder 306 to compress and transmit the image data of the video sequences to be displayed on a remote receiving device that can also display the video or frame sequences. Thus, system 300 may be a computer that performs many different tasks in addition to the image processing tasks that are relevant to the present description. The system 300 may have a display 302 that is a separate monitor connected by cable to the computer, or as shown by the dashed line around display 302, the display may be an integral component of the system 300 such as with a laptop computer, tablet, smartphone, and so forth. It will be understood that display 302 could also be connected wirelessly to the system 300.

The OS 304 may be many different operating systems and is not limited to any one such OS as long as it has or communicates with a view manager 310 such as a desktop windows manager (DWM) by one example that may or may not be considered a part of the OS, and as long as the OS or other component communicating with the OS can provide the data for display as described herein. The OS communicates with a display engine 308 that operates the display 302 and may run hardware such as a display driver or controller.

The processing system 300 also may have a user interface 312 to receive user input to move an object being shown on the display 302. A device control 314, such as a device driver, may be provided to control the user interface and receive signals indicating the user input. The data indicating the user input may be provided to the OS 304 so that the OS's view manger 310 can determine how to move the object on the display 302. The user interface 312 may be a mouse, keyboard, touchscreen, touchpad, track ball, pointing stick, game controller, microphone (to receive voice commands), motion detector (when motion of a user moves the object on an image), and so forth. By one form, motion detectors may be used on head mounted displays so that the distance of the motion of the person's head may be used as the distance the object traveled in the images presented to the user. Likewise, motion detection here includes camera-based gestures and eye tracking sensors that may be used to provide distances that an object travels on an image.

By one possible non-limiting example, the OS may be Windows OS DirectX Graphics Infrastructure (DXGI) that provides a flip presentation model and that tracks the static and scroll regions to reduce the amount of data to be generated for rendering a frame on the local display 302. In this case, the user may manually input a scroll distance by using a mouse wheel, selecting and moving a slide button on a virtual slide on the display, or swiping ones finger on a touchscreen of a mobile device to scroll the images on the display as in a web browser, word processor, or email listing program for example. In this case, the object may be the portion of the frame that has fixed content but moves up or down in the frame.

By the examples provided herein, the system 300 does not compress the images that are processed for display on the display 302. In most cases, the display 302 may be considered local displays but not always. In some alternative cases, an encoder could also be provided for the display driver or engine 308 to compress images to be displayed at display 302. In the latter case, the content information may be provided to a different encoder, or the encoder 306 may be provided at display engine 308, to compress the image data for transmission of the image data while content information is being retrieved for further display and further compression. The present methods discussed herein apply as long as the content information is being provided and used by an encoder to compress image data at some point.

An application 316 that uses a display as described above may provide predefined objects (app defined objects 320) that are stored and displayed as needed, such as in a game where the shape of the object does not change, or drawing or presentation programs have predetermined shapes that a user can insert and move in a drawing. Other games, or other applications, may provide objects of fixed sizes that only change to certain known positions within a frame (such as toggles, buttons, or indicators on a menu). Other applications may have objects that move to known positions but themselves may have variable shapes. With any of these alternatives, the application may have the object description including fixed shape (or dimensions) and/or fixed positions stored in a memory 318, which may be any type of practical memory whether volatile or non-volatile, main memory, local memory, RAM, cache, and so forth and as needed.

Otherwise, the user may define the shape of the object while using the application whether drawing the object from scratch, building upon other predefined objects, or collecting objects to move, such as when a user selects a number of objects on a screen to be moved together while maintaining the relative distance and position between the objects, cooperatively becoming a single object for the purposes herein. The definition or dimensions of such object also may be stored (user defined objects 322) in memory 318 so the object can be moved.

So arranged, the signal or data from the user interface may first define an object if not done so already by selecting predefined objects on an image and/or drawing the objects as mentioned, and then performing some activation of the user interface to select the drawn object. The selection of the object by the user may activate the application to bring the identity and dimensions (or size) of the object from memory and to the OS or by one example, a module considered to be an object control unit 324 for the purposes of the methods herein.

The user input also may indicate the first position of the object. Then the user may move the object by using the same or other user interface, and to a second position. This motion including x and y distances that indicate the direction and total distance of the motion of the object (or just the location of the second position) is provided to the view manager 310 so the motion of the object can be displayed on the display 302, but also provided to the object control unit 324 and then to the application 316 so that the application understands the new position of the object and can react accordingly. Otherwise, an automatic motion of an object by the application also may be provided to the object control unit so that the OS understands the dimensions and positions of an object, which is then provided to the view manager 310 to move the object on the display 302. The object control unit 324 then may provide the object identification, dimensions (as a pixel map for example), the start and end position of the object whether by providing two different sets of coordinates (x, y) or one set of coordinates and a distance and direction to the second position by x and y distances for example. By one approach, the selected locations are provided as hot zones where the exact dimensions of an object are not necessarily saved to be provided to an encoder for example because it would require extra processing to compute the exact dimensions (pixel locations) of the object. Instead, it is desirable to skip such time and computation load to determine such precise positioning of the object. In this case, the coordinates of the selected hot spots or dimensions of the hot zone are provided to at least concentrate the motion estimation search near the hot spots or hot zones. More detail is provided below.

It will be understood that the object control unit 324 may or may not be considered a part of the OS, and it also will be understood that the object control unit 324 is not necessarily a single distinguishable module separate from other operations of the OS and application, and is at least that code which may provide the dimensions of the object in whatever detail the dimensions are available if it is available at all, and provides at least the data indicating the start and end (first and second) positions of the object. Such object data may be provided by more than one module or unit considered to cooperatively form the object control unit 324.

The image data of the input frames 326 of the video sequence from an input frame buffer for example, and the display content information such as the object data from the object control unit 324 are synchronously provided to the encoder 306 by one example. The object data may be stored in tables or lists in a memory that is accessible to the encoder. By other options, the object data may be in the form of metadata that is placed in the headers or overhead of individual frames, or is otherwise embedded within the frame data or accompanying the frame data when the frames are provided to the encoder 306.

The encoder 306 uses the object data to reduce motion estimation searches to generate motion vectors and to ultimately compress the frames and place them in a bitstream for transmission as discussed elsewhere herein. The compressed bitstream 328 then may be sent wirelessly over a radio by one example, such as a radio 1118 (FIG. 11) or by cable to a sink device with a decoder to show the images on a remote content display 330 by some examples. The remote display 330 can have any display or screen configuration consistent with that described herein.

Referring to FIG. 4, an example video or frame coding system 400, such as encoder 306, may be an encoder where current video information in the form of data related to a sequence of frames may be received for compression, including a frame sequence of screen shots of a computing device. The encoder 400 may be receiving display content information such as object data from an object control unit 324 as described with system 300 and may or may not be considered a part of the system 400. To perform the encoding operations, the system 400 may include an input picture buffer (with optional picture re-orderer) 402, a prediction unit partitioner 404, a subtraction unit 406, a residual partitioner 408, a transform unit 410, a quantizer 412, an entropy encoder 414, and an encoder control 416. The encoder control 416 manages many aspects of encoding including rate distortion or selection of correct motion partition sizes, correct coding partition size, best choice of prediction reference types, and best selection of modes as well as managing overall bitrate to name a few examples. Thus, while the object control unit 324 is shown to provide display content information directly to components of the encoder suggesting those components control how the display content information is used, actually the encoder control 416 may receive the display content information and may be operating those components depending on the display content information by one example.

The output of the quantizer 412 may be provided to a decoding loop 450 provided at the encoder to generate the same reference or reconstructed blocks, frames, or other units as would be generated at the decoder. Thus, the decoding loop 450 may use inverse quantization and inverse transform units 418 and 420 to reconstruct the frames, and residual assembler 422, adder 424, and prediction unit assembler 426 to reconstruct the units used within each frame. The decoding loop 450 then provides filters 428 to increase the quality of the reconstructed images to better match the corresponding original frame. This may include a deblocking filter, a sample adaptive offset (SAO) filter, and a quality restoration (QR) filter. The decoding loop 450 also may have a decoded picture buffer 430 to hold those frames to be used as reference frames for inter-prediction.

The encoder 400 also has a motion estimation module or unit 432 that provides motion vectors as described below, and a motion compensation module 434 that uses the motion vectors to form prediction blocks. The motion estimation unit 432 and motion compensation unit 434 form the inter-prediction capability of the encoder. It will be understood that the motion estimator 432 may use a variety of techniques to form the motion vectors including block matching searches such as hierarchical motion estimation (HME), spatial dependencies, integer motion estimation (such as brute force searches that test all blocks on a frame) (IME), fractional or sub-pixel searches (FME), and zero motion vectors (ZMVs). As explained in detail below, the motion estimation unit 432 may receive the object data and may either revise the search parameters for motion vectors between a reference frame and a current frame, or may eliminate the need for the search altogether. In the latter case, the object motion data may be provided in the form of a motion vector either to the motion estimation unit to format the motion data before passing it off to the motion compensation unit, or directly providing the motion data as a motion vector to the motion compensation unit 434 for generating a prediction for one or more blocks of a frame found to be associated with the frame position of an object. An intra-frame prediction module 436 provides the intra-prediction capability. Both the motion compensation module 434 and intra-frame prediction module 436 may provide predictions to a prediction mode unit 438.

The prediction mode unit 438 selects the best prediction mode for a particular block. It may compare inter-prediction based predictions of different sub-block arrangements for a single block, an intra-prediction based prediction (which also may include comparing multiple sub-block arrangements), and a skip. The mode selector 438 may have a partition unit 440 to determine when and which sub-block arrangements are to be considered, a mode comparison unit 442 to perform the actual comparisons, and then a mode selector 444 to make the best prediction decision based on the comparison outcomes.

As shown in FIG. 4, the prediction output of the selector 438 in the form of a prediction block is then provided both to the subtraction unit 406 to generate a residual, and in the decoding loop to the adder 424 to add the prediction to the residual from the inverse transform to reconstruct a frame. A PU assembler (not shown) may be provided at the output of the prediction mode unit 438 before providing the blocks to the adder 424 and subtractor 406 for HEVC or other standard operation.

More specifically, the video data in the form of frames of pixel data may be provided to the input picture buffer 402. The buffer 402 holds frames in an input video sequence order, and the frames may be retrieved from the buffer in the order in which they need to be coded. For example, backward reference frames are coded before the frame for which they are a reference but are displayed after it. The input picture buffer also may assign frames a classification such as I-frame (intra-coded), P-frame (inter-coded, predicted from a previous reference frames), and B-frame (inter-coded frame which can be bi-directionally predicted from a previous frames, subsequent frames, or both). In each case, an entire frame may be classified the same or may have slices classified differently (thus, an I-frame may include only I slices, P-frame can include I and P slices, and so forth). In I slices, spatial prediction is used, and in one form, only from data in the frame itself. In P slices, temporal (rather than spatial) prediction may be undertaken by estimating motion between frames but also may include spatial dependencies to derive motion vectors. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used, the prediction partitioner unit 404 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block also may be divided into coding units (CU) in quad-tree split scheme. Further, each leaf CU on the quad-tree may either be split again to 4 CU or divided into partition (or prediction) units (PU) for motion-compensated prediction. In various implementations in accordance with the present disclosure, CUs may have various sizes including, but not limited to 64×64, 32×32, 16×16, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like. By some alternatives, this may include considering the block a macroblock or a division of a macroblock of video or pixel data for H.264/AVC, VP8, VP9, and the like, unless defined otherwise.

Also in video coding system 400, the current video frame divided into LCU, CU, and/or PU units may be provided to both the motion estimation unit or estimator 432 and the prediction mode unit 438. System 400 may process the current frame in the designated units of an image in raster or different scan order such as waveforms. When video coding system 400 is operated in inter-prediction mode, motion estimation unit 432 may generate a motion vector in response to the partition selection by the prediction mode unit 436, the current video frame, and a reference video frame as described below.

A number of different block-based search methods are described herein and may be used to match a block of a current frame with one or more candidate blocks on a reference frame, and thereby determine a motion vector to be encoded for a prediction block. Otherwise, other motion estimation methods to determine a motion vector may be used that reduce the need for block matching at an individual block including the spacial dependency methods, using a ZMV, or even using the motion vector of blocks on a previous frame, to name a few examples. The motion compensation module 434 then may use the reference video frame and the motion vector provided by motion estimation module 432 to generate the predicted blocks or predicted frame, and provide these predictions to the prediction mode unit 438.

In the partition unit 440 of the prediction mode unit 438, by one example for HEVC, if the size of a CU is 2N×2N, a request is sent to the motion estimation unit to provide MVs for multiple block sub-divisions so that the mode comparison unit 442 can check the Lagrangian cost function of predictions using multiple or exhaustively all modes in a level such as 2N×2N, 2N×N, N×2N, N×N, 3N/4×2N, N/4×2N, 2N×3N/4, 2N×N/4. By one example, the Lagrangian cost function is determined for each mode by converting bits into a distortion using a Lagrangian multiplier. The Lagrangian cost function may be defined for a mode selection where resultant bits R and a distortion D are determined by a mode for each CU. The best prediction mode of a level is selected based on the minimum value of the cost function. By one example, if any prediction mode except N×N is selected then the selected mode is the final mode for the CU. If N×N is selected in the top level of the coding tree based on the cost function, then N×N/2, N/2×N, N/2×N/2, 3N/4×N, N/4×N, N×3N/4, and N×N/4 modes are checked against the cost function of the N×N mode. If N/2×N/2 mode provides minimum cost function, then the next lower level is also tested. Otherwise, by one example, the final decision is taken in the N/2×N/2 level of the coding tree. As explained below, the encoder may determine whether any of the blocks are associated with any one of the objects for any of the alternative block arrangements being analyzed.

The object data provided to, or accessible to, the motion estimation unit may be the coordinate positions of the moving object on the current frame and the change in position of the object (in x and y motion values for example) to indicate the first and second (reference) positions. When the exact dimensions or shape of the object is not provided in the object data as well, the reference position of the object may correspond to a hot spot (the second position coordinates), or hot zone around the hot spot when so provided, at the second position and established by the OS and/or application, and the motion estimation unit 432 may modify the search parameters to find a reference block on a reference frame that matches a current block on the current frame being analyzed. This may include concentrating the search within a certain number of pixels near the hot zone, or within the hot zone, or centering the usual search patterns of the motion estimation unit 432 at the hot zone. Other examples are mentioned below. The generated motion vector is then provided to the motion compensation unit to generate a prediction or individual blocks.

By another form, when the object data includes the exact pixel arrangement of an object, or the exact pixel arrangement of the object can be calculated, the search for the block may be entirely avoided. In this case, all those blocks in the reference frame that are within the pixel locations of the object (by at least a certain percentage or other criteria) are provided with motion vectors parallel to the motion of the object between the reference frame and the current frame, and at the same distance. The computed motion vectors (in the form of the motion data) are then provided to the motion compensation unit as well.

The object data, when retrieved by the encoder, may be identified for use with particular corresponding reference and current frames by a number of different ways. As mentioned, the object data may be metadata or other data forms embedded within or accompanying certain frames such that the identity of a frame to its object data is inherent. Otherwise, when the object data is stored separately from the frames, a synchronous buffer may be used so that the object data is in the same order as the coding order of the frames within the buffer so that it is known that the object data in a certain position in the buffer corresponds to a frame in a certain position within the encoder. Alternatively, the object data may have an ID, tag, order, or other insignia when stored in a memory on a table, for example, accessible to the encoder and that indicates which frame the object data corresponds to so that the encoder can simply retrieve the data for a specific frame as needed.

As mentioned, the motion compensation unit 434 will determine predictions from each of the motion vectors, and this may be for alternative reference block arrangements for the same current block depending on the coding standard. The motion compensation unit 434 then provides the predictions to the prediction mode unit 438 along with any other predictions from other units such as the intra-prediction unit.

The best predicted block from the prediction mode unit 438 then may be subtracted at subtractor 406 from the current block, and the resulting residual, when present, is provided to the residual coding partitioner 408. Coding partitioner 408 may partition the residual into one or more blocks, and by one form for HEVC, dividing CUs further into transform units (TU) for transform or further compression, and the result may be provided to a transform module 410. The relevant block or unit is transformed into coefficients using variable block size discrete cosine transform (VBS DCT) and/or 4×4 discrete sine transform (DST) to name a few examples. Using the quantization parameter (Qp) set by the encoder control 416, the quantizer 412 then uses lossy resampling or quantization on the coefficients. The generated set of quantized transform coefficients may be reordered and entropy coded by entropy coding module 414 to generate a portion of a compressed bitstream (for example, a Network Abstraction Layer (NAL) bitstream) provided by video coding system 400. In various implementations, a bitstream provided by video coding system 400 may include entropy-encoded coefficients in addition to side information to be used to decode each block (e.g., prediction modes, quantization parameters, motion vector information, partition information, in-loop filtering information, and so forth), and may be provided to other systems and/or devices for transmission or storage.

The output of the quantization module 412 also may be provided to de-quantization unit 418 and inverse transform module 420 in a decoding loop. De-quantization unit 418 and inverse transform module 420 may implement the inverse of the operations undertaken by transform unit 410 and quantization module 412. A residual assembler unit 422 may then reconstruct the residual CUs from the TUs. The output of the residual assembler unit 422 then may be combined at adder 424 with the predicted frame to generate a rough reconstructed block. A prediction unit (LCU) assembler 426 then reconstructs the LCUs from the CUs to complete the frame reconstruction.

The reconstructed frames are filtered, and then provided to a decoded picture buffer 430 where the frames may be used as reference frames to construct corresponding predictions for motion estimation and compensation as explained herein. When video coding system 400 is operated in intra-prediction mode, intra-frame prediction module 436 may use the reconstructed pixels of the current frame to undertake intra-prediction schemes that will not to be described in greater detail herein.

In some examples, video coding system 400 may include additional items that have not been shown in FIG. 4 for the sake of clarity. For example, video coding system 400 may include a processor, a radio frequency-type (RF) transceiver, splitter and/or multiplexor, a display, and/or an antenna. Further, video coding system 400 may include additional items such as a speaker, a microphone, an accelerometer, memory, a router, network interface logic, and so forth. Some of these components are shown on other implementations described herein.

Referring to FIG. 5, a system 500 may have, or may be, a decoder, and may receive coded video data in the form of a bitstream and that has motion vectors for individual blocks that are established by the use of the display content information such as the object data at the encoder. The system 500 may process the bitstream with an entropy decoding module 502 to extract quantized residual coefficients as well as the motion vectors, prediction modes, partitions, quantization parameters, filter information, and so forth. The system 500 then may use an inverse quantizer module 504 and inverse transform module 506 to reconstruct the residual pixel data. The system 500 then may use a residual coding assembler 508, an adder 510 to add the residual to the predicted block, and a prediction unit (LCU) assembler 512. The system 500 also may decode the resulting data using a decoding loop employed depending on the coding mode indicated in syntax of the bitstream and implemented via prediction mode switch or selector 522, and either a first path including an intra prediction module 520 or a second path that is an inter-prediction decoding path including one or more filters 514. The second path may have a decoded picture buffer 516 to store the reconstructed and filtered frames for use as reference frames as well as to send off the reconstructed frames for display or storage for later viewing or another application or device. A motion compensated predictor 518 utilizes reconstructed frames from the decoded picture buffer 516 as well as motion vectors from the bitstream to reconstruct a predicted block. Thus, the decoder does not need its own motion estimation unit since the motion vectors are already provided, although it still may have one. A prediction modes selector 522 sets the correct mode for each block, and a PU assembler (not shown) may be provided at the output of the selector 522 before the blocks are provided to the adder 510. The functionality of modules described herein for systems 400 and 500, except for the units related to the display content information such as the object control unit 316, for example and described in detail herein, are well recognized in the art and will not be described in any greater detail herein.

Referring now to FIG. 6, an example process 600 is arranged in accordance with at least some implementations of the present disclosure. In general, process 600 may provide a computer-implemented method of video coding using display modification input as mentioned above. In the illustrated implementation, process 600 may include one or more operations, functions or actions as illustrated by one or more of operations 602 to 606 numbered evenly. By way of non-limiting example, process 600 may be described herein with reference to operations discussed with respect to FIGS.

2-5 and 10 herein and may be discussed with regard to example systems 200, 300, 400, 500, or 1000 discussed below.

The process 600 also may comprise "obtain temporal display content information of image data of frames of a frame sequence and comprising object data of at least one object being moved from frame to frame due to user or automatic input to an application providing the temporal display content information, wherein the at least one object is defined before encoding and for at least one reason that is not solely for encoding" 602. As mentioned above, when displaying images of a frame sequence of an application that generates images on a local display on a computing device, the application may automatically move objects on the local display or may receive user input so that a user can move objects on the local display as controlled by an OS and/or the application, and where the objects are defined for reasons related to operating the application rather than, or in addition to, any reason related to efficiently providing data for encoding the frames, if any exist. In other words, the defining of the objects (such as a foreground separated from a background) is related to artistic or presentation purposes, not just for efficiency for encoding the data, if that reason is even present. The application may generate content display information such as object data regarding the motion of at least one object. Thus, the object data may include at least first or current frame position and a change in position to a second or reference frame position of the object. This may include x and y components of the motion to indicate the distance (or offset) and direction of the motion. Otherwise, a single distance and single direction value could be used instead. Alternatively, the object data may include one position on one frame and the coordinates of the second position on the other frame. This temporal display content information is obtained by, or is made accessible to, the encoder. This may be in the form of metadata or other embedded format that accompanies the frames, or otherwise may be stored in tables or lists in a memory accessible to the encoder by one example.

The process 600 may comprise "obtain pixel image data of the frames to encode the frame sequence" 604, and particularly obtained by the same encoder that obtained the display content information. By one example, the encoder may process images using HEVC or other standards that use the pixel image data such as the chroma or luminance or both values of the pixels to be used to form the image as described above.

The process 600 then may include "determine at least one motion vector associated with the at least one object based, at least in part, on the temporal display content information" 606. Specifically, and described in detail below, the object data may be used by a motion estimation unit to either omit the search for matching blocks altogether or to modify the search parameters depending on which data is provided in the object data. When the object data includes the precise location of the pixels (relative to each other) forming the object or at least sufficient data to calculate the pixel locations forming the object, and in addition to a position of the object, then the motion of the object, in the form of the x and y differences between the first and second positions is used as the motion vector for one or more blocks found to form the object on the current frame and is provided to the motion compensation unit. In this case, the encoder may determine which blocks of pixels form the object, or at least a certain percentage of a block is within the object, and provide those blocks forming the object on the current frame with motion vectors all parallel to the movement of the object between the current (first position) and reference (second position) frame.

By other approaches, when the exact pixel locations forming the object are not provided (the hot zone may be provided instead), or when computations to determine such pixel locations are too computationally heavy (such that it will significantly slow the system or cause too much power drain), or when the dimensions are not provided at all (just the hot spot or motion data is provided), in this case the search for matching blocks may be modified so that the search is concentrated or centered at the location or hot zone established by the object data and on the reference frame. This may include reducing the total area of a search. This also may include eliminating stages in hierarchical searches with multiple search patterns, or reducing the number of sample points to be used in the search. The details are explained below.

Figure 7:
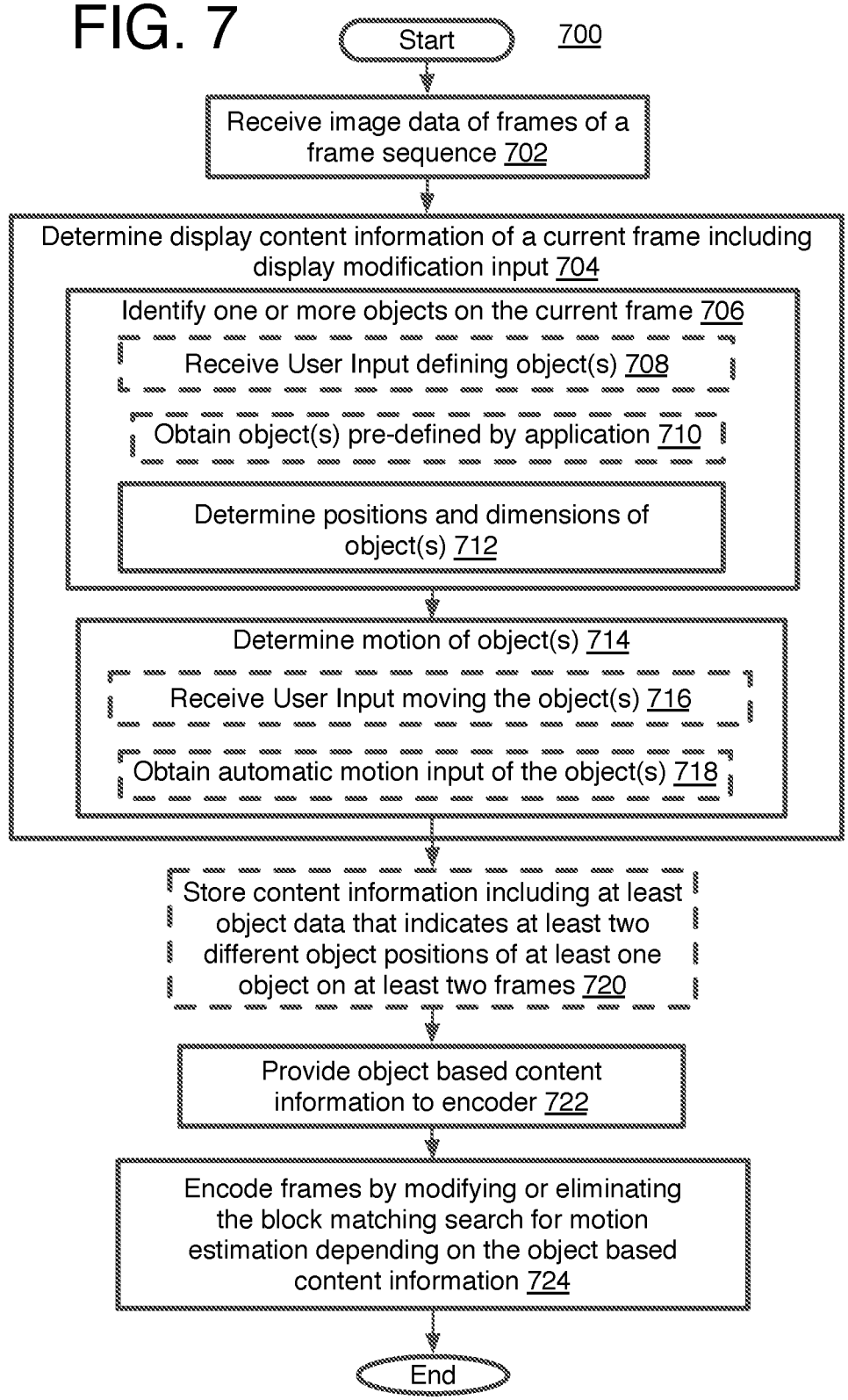
FIG. 7 is a detailed flow chart of a method of video coding using display modification input according to the implementations herein.

Referring now to FIG. 7, an example process 700 is arranged in accordance with at least some implementations of the present disclosure. In general, process 700 may provide a computer-implemented method of video coding using display modification input, and particularly, to a method related to obtaining the object data in the first place, and placing it in a form to be provided to an encoder. In the illustrated implementation, process 700 may include one or more operations, functions or actions as illustrated by one or more of operations 702 to 724 generally numbered evenly. By way of non-limiting example, the process 700 may be described herein with reference to operations discussed with respect to FIGS. 2-5 and 10 herein and may be discussed with regard to example systems 200, 300, 400, 500, or 1000 discussed below.

Process 700 may include "receive image data of frames of a frame sequence" 702, and particularly, a system or device may have one or more applications that generate images for immediate display, and the images may be saved at least on volatile memory (RAM) or other memory as a sequence of frames to be encoded, transmitted, decoded, and displayed on another remote device. Otherwise, the frame sequence may have been placed in non-volatile memory to be viewed when desired. A frame sequence may include content to be displayed on a computing device for many different applications such as games, graphics programs, web browsers, word processors, spread sheets, and so forth and as already mentioned above. The application may be any application that provides anything visual that can be displayed on a display in the form of a frame sequence and has objects in the images of the frames that can be modified from frame to frame either by user input or automatic input (the application itself) and is otherwise not particularly limited. The operations for locally displaying the frame sequence may include pre-processing sufficient to view the video or frames such as de-noising and so forth. The frame sequence also may be stored where it is accessible to an encoder on or communicating with the device, such as an input buffer for the encoder.

Process 700 may include "determine display content information of a current frame including display modification input" 704. Thus, while the frames are being generated and displayed on the local display, a user may input commands through an interface and operating system to modify the images by moving objects on the local display from one location to another location. Otherwise, the application may be automatically moving objects on the local display. This may include the following operations.

Process 700 may include "identify one or more objects on the current frame" 706, and particularly, identify objects that can be moved. By one approach this may include the preliminary operation of "receive user input defining objects" 708. This refers to the arrangement where the user may select objects on an image to move. Often the selected objects are highlighted in some way to indicate that the user has selected the objects. Some examples are in a flow chart or presentation drawing program where a user may select one or more parts of a drawing to be moved alone or to be grouped to be moved together as a single group or object. This also may include highlighting text in any program that present words and to copy and paste the text whether or not dragging of the text from one spot to another is shown on the display. Many different examples exist.

Another possible example included here is when a user scrolls a page on the display where the distance of the scroll selects the direction (usually horizontal or vertical) and the distance (or offset) of the scroll. The area of the image that remains the same except that its position is moved on the frame is the scrolled selected area of the image. This happens often with web page viewing or on word processors for example. By other examples mentioned herein, the methods are not limited at all to scrolling environments.

Process 700 may include "obtain object(s) pre-defined by application" 710, and this refers to where the application already has objects defined, and the definitions of these objects are saved in a memory for example. This may include many different things from pre-defined shapes or templates drawn in drawing programs such as Visio®, Omnigraffle®, Solidworks®, or AutocCAD® to name a few examples. When a user inserts these objects into a drawing, it is expected that the objects will be moved around. Other examples include any game where a character controlled by a user selects and moves an item in the game, or a game has pieces moved by the user such as the chess pieces mentioned above.

By one form, the selecting of the object(s) also may be performed by the use of hot zones. The exact spot or pixel on a frame where a user selects an object may be referred to as the hot spot, and anywhere on a frame that can be a hot spot for a particular object forms the hot zone. Thus, the hot zone may be larger than the object in order to make it easier and faster for a user to select the object simply by pointing a cursor and clicking the image near the object rather than exactly within the object. The nearest or included object associated with the selected hot spot is considered the selected object.

Process 700 may include "determine positions and dimensions of object(s)" 712. As mentioned then, some objects including their exact dimensions may be predetermined and saved, such as icons on a desktop or in other programs (here the OS may be operating as an application to present a desktop). The position of the objects on the frames may be a uniform designation (or anchor point) such as the center of the object or the upper-left corner of any object, and this may be selected to be consistent with the use of blocks on the encoder (such as upper left corner). The positions of the objects may be tracked and determined by the application in order to operate the application and the application's display. Thus, whether the positions are set by the application or changed by the user, the application must know the positions to be able to operate. This positioning may be provided to the object control unit as described above.

The objects dimensions also may be saved, whether predetermined or after being selected by the user or the application itself. The exact dimensions by pixel may be saved essentially forming a map of pixels to show which pixels are included in the object and which are not. This may include sufficient data to compute which pixels form the object such as indicating the first and last pixel on each row (or how many pixels on the row from the first pixel) forming the object. The pixel locations may be in a format that is relative to the anchor point of the object or some global coordinate system of the frame for example, and may be saved in a number of different ways. By one example, an object template or structure may be stored as a binary map, or as an application or global OS-based look-up table that defines the object as well as dimensions in terms of the x, y coordinates of the object. In this case, a table index may be passed to the encoder instead of all the other information data, and the encoder could then look up this table and extract the size of the object and/or region as needed.

By other options, the exact pixel locations are not saved as the dimensions of the objects and only rough dimensions or sizes are provided, such as X rows by Y columns. This is particularly true when hot zones are used instead of the exact dimensions of the object. It also will be understood where the size of the object is tied into the location on the frame. Thus, the dimensions may be provided as row 20 to 40 and column 40 to column 60 on the frame, where (0, 0) is the upper left corner of the frame for example. This may or may not be converted into dimensions of the object without referring to the frame (20×20 pixels) depending on what format is needed to be provided to the encoder.

By other options, the dimensions of the object are not provided at all, and any modification to the motion vector searches are based on the object's motion data alone as described below. In this case, the second position of the object may be considered a hot spot (although the actual hot spot selected by the user may be at the last frame of a series of frames that depict the motion of the object until a final position in the last frame of the series).

Process 700 may include "determine motion of object(s)" 714, and this is determined by obtaining the motion from the OS or application, and particularly at an object control unit for example that will track and hold the object data. This may be accomplished as follows.

By one form, process 700 may include "receive user input moving the object(s)" 716, and specifically, the application needs to understand the motion of the object in order to operate whatever display it is performing. The application receives data informing the application that a user inputted commands through a user interface to move the object in a certain direction and distance. The application then initiates that motion through the view manager at the OS to show the motion on the local display. The user interface may be many different devices including a mouse, touchscreen, and many others mentioned above.

Process 700 may include "obtain automatic motion input of the object(s)" 718, and this refers to the application itself initiating some motion or responding to the motion established by the user. This could be the application starting a game by moving a ball, or could be the movement of a chess piece when a user is playing the computer as mentioned above. Many other examples exist.

The object control unit also may track the change of position of an object from frame to frame over frames that are likely to be a reference for a current frame during encoding. This may be assumed to be the previous frame for a current frame so that by one form, each frame is treated as a current frame that may be a P-frame during encoding. Thus, even though the application may only initiate and record the total motion of the object from one position to another position over a large number of frames, such as 30 frames, the object control unit may retrieve the changes in object position from single frame to single frame from the OS since the OS will determine how the object appears frame to frame anyway in order to locally display the object moving. This better aligns the reference and current frames of the encoder with the second and first positions of the object. This may or may not be limited to when the objects are dragged within the display as the objects are being moved from position to position, although it need not always be so limited. This may equally apply when the object jumps from position to position.

It should be noted that since the motion is obtained from the application, in most cases comparing of frames should not be needed in order to determine the direction and distance of the motion. The OS may merely interpolate positions frame to frame when given a total change in position of an object over a series of frames. When the application and OS does not generate this data, the method may be skipped since the encoder will need to compare individual current frames to a consecutive previous frame anyway. When the comparison will be performed by the OS nonetheless, many other variations could be used such as some interval of frames, or only selection of frames of a certain type, like those most likely to be a P (prediction) frame for the encoder, and so forth.

Process 700 may include "store content information including at least object data that indicates at least two different positions of at least one object on at least two frames" 720. By one form, the motion is indicated to the application and saved as (x, y) coordinates of the change in position from coordinates of a first position, and these change or motion coordinates as well as the first or start position are made available as part of the object data to the object control unit for passing on to the encoder. It will be understood that the format saved and provided to the encoder may be in a format compatible with the encoder, which is the coordinates mentioned in many cases. In other alternatives, the exact distance and angle of the direction from one position to another may be provided, and/or the coordinates of the second position as well or instead.

It also will be understood that the stored object data may include the frame identification and the dimensions of the individual objects, whether precise dimensions showing which pixels form the object, or rough dimensions as described above. By other options, the dimensions of the object are not provided at all.

By yet another option, the object data also may include an indication of the type of application that the object was used in. This could be a single number code or flag to indicate classifications such as game or scroll program (such as a web page, word processor, or spread sheet). In these cases, the encoder may be able to modify search or other parameters due to the type of active application where in a game the object is likely to move while the background stays fixed, versus the scroll type where most of the display will be scrolled in one uniform direction at a time.

Process 700 may include "provide object based content information to encoder" 722, and by one form, the data may be provided as metadata or other embedded formats placed in the heading or overhead considered to be accompanying the main frame data (the pixel chroma and luminance data). By one form, the system provides the object data to the encoder only when the encoder queries the OS for the object data. By other examples, the OS continuously transmits the object data to the encoder without such a query.

By yet another option, the encoder has access to tables or lists listing the object data in a memory and can access the memory as needed when a frame is associated with objects in the memory. By one form, the encoder checks the memory to see if objects for a frame being analyzed are there.

Process 700 may include "encode frames by modifying the block matching search for motion estimation depending on the object based content information" 724, and where the search is modified when rough or no object dimensions are provided, but also includes completely eliminating the search when precise object dimensions are provided. This is explained in detail with process 800 that covers the use of the object data at the encoder.

Figure 8:
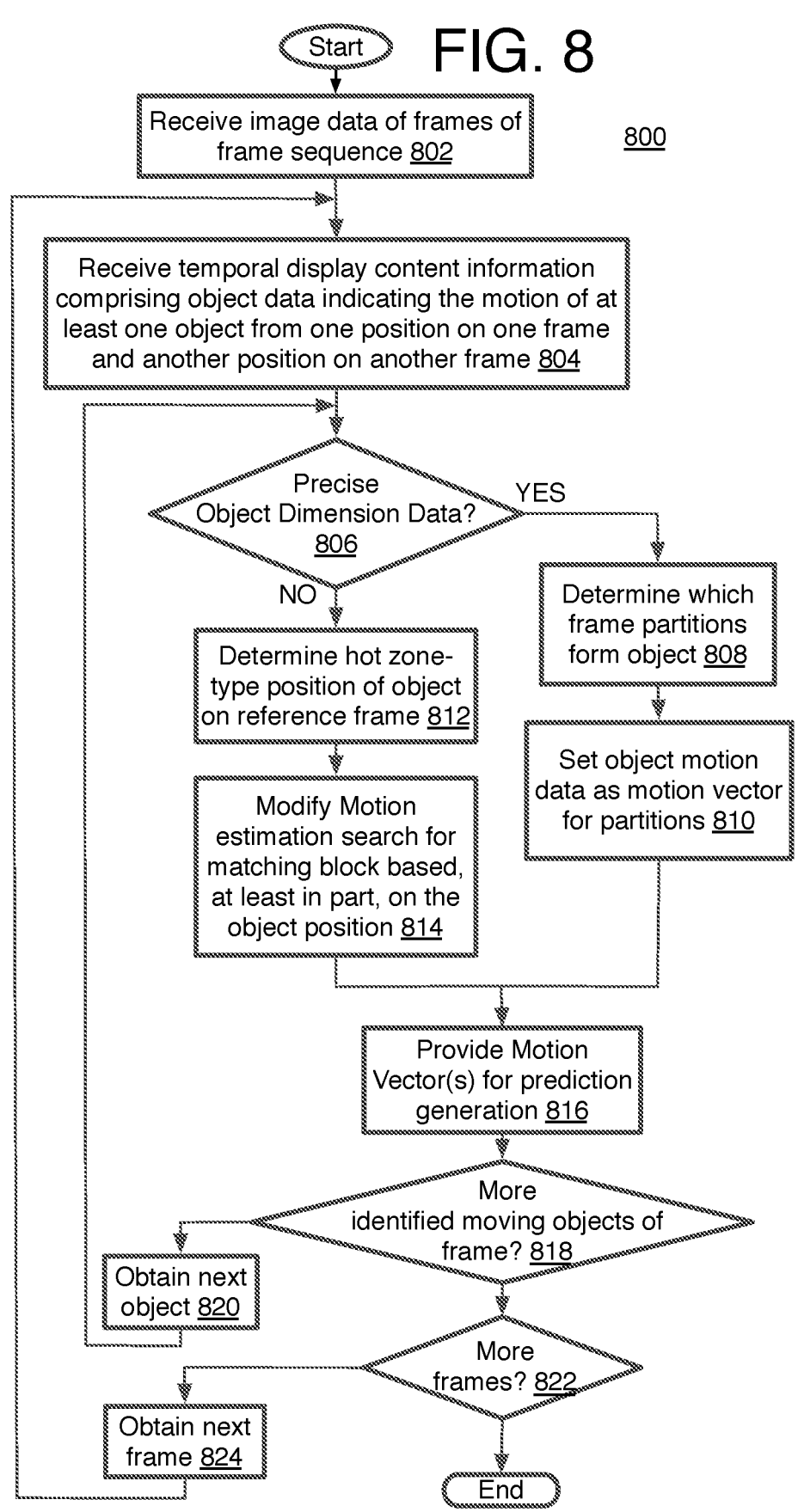
FIG. 8 is another flow chart of a method of video coding using display modification input according to the implementations herein.

Referring now to FIG. 8, an example method 800 of video coding using display modification input is provided, and particularly related to the encoder's use of the object data. In the illustrated implementation, process 800 may include one or more operations, functions, or actions as illustrated by one or more of actions 802 to 824 generally numbered evenly, and used alternatively or in any combination. By way of non-limiting example, process 800 may be described herein with reference to operations discussed with respect to any of the implementations described herein.

Process 800 may include "receive image data of frames of a frame sequence" 802, which may merely refer to having the frames in an input buffer and accessible to the encoder. The frames may or may have already been pre-processed sufficiently for encoding including any de-noising and so forth and any format conversions such as color space conversion (between YUV and RGB for example) or dynamic range conversions (between HDR and SDR for example). The frames ar3e otherwise ready for encoding.

Process 800 may include "receive temporal display content information comprising object data indicating the motion of at least one object from one position on one frame to another position on another frame" 804. As explained, the object data may be extracted from the frame data when embedded with the frame data as metadata for example. Otherwise, the object data may be obtained from one or more tables or lists from a memory, and may be retrieved by the encoder as needed synchronously with the encoding of corresponding frames. Such metadata and tables may have object data that includes at least a starting coordinate position and motion coordinates that is the x horizontal and y vertical change in location from the starting position. The object data also may include either the rough dimensions or size of the object such as with a hot zone, or may include precise dimensions. By other options, no dimension data is provided. The object data also could optionally include the chroma and luminance values of the object but usually this won't be necessary as long as the object at the first position of a current frame is defined and can be located on the separate frame data of the current frame.

Process 800 may include "precise object dimension data?" 806, and now to check a first object, and then all of the other objects on a frame one-by-one thereafter as explained below, whether precise pixel dimensions or pixel map of the object is provided, or at least data sufficient to compute which pixels are included in the object, as described above.

When precise dimensions are provided, process 800 may include "determine which frame partitions form object" 808, and the partition or block locations that the motion estimation unit will use and need to be matched to reference blocks are compared to the pixel locations of the first position of the object and on the corresponding current frame. The encoder may select multiple alternate blocks that match the first position of the object depending on whether the encoding standard, such as HEVC, tests alternate block arrangements for prediction mode selection. Thus, each alternative arrangement may have its own different set of blocks that forms the object at the first position on the current frame.

Process 800 then may include "set object motion data as motion vector for selected partitions" 810. Thus, the x and y change in position indicating the direction and distance the object moves from the first position to a second position on a reference frame is adopted as the motion vector. When this is the correct format of motion vectors to be provided for motion compensation, any other format saved as the object data such as magnitude and direction, may be converted into the x and y format. In this case, the search for matching blocks on a reference frame is omitted altogether for those blocks considered to be covered by the object. Each block associated with the object then receives a motion vector that is parallel to the motion of the object.

This also may include the encoder alternating the partitioning to match the boundaries of the object on the current frame, although this may have already been done so simply due to the change in pixel chroma and luminance values at the boundaries of the objects. When blocks extend into and out of an area of a frame considered to be part of an object, those blocks may be considered as part of the object based on some criteria or threshold such as more than about 50 percent of the area of the block within the object, although many alternatives could be used including a more inclusive alternative such as any block with at least 10 percent of its area within the object boundary is considered a part of the object. Many other alternatives exist.

When the object data does not include precise dimensions of an object or does not include any dimension data, process 800 may include "determine hot zone-type position of object on reference frame" 812, and the dimensions of the object at the second position on the reference frame are determined from the object data. The object data may expressly include such data or it may need to be calculated by using the motion data of the object, the first position on the current frame, and the rough dimensions of the object, which may be the hot zone dimensions.

Process 800 may include "modify motion estimation search for matching block based, as least in part, on the object position" 814. In this case, the search for blocks on a reference frame that match the blocks forming the object at the first position on the current frame is modified based on the location of the second position of the object on the reference frame. This may include many different things such as centering the search over the second position or moving the search to at least cover the second position. Thus, the search may cover an area of the frame, at the second position, it may not have searched at all, or would not have concentrated on, thereby increasing the efficiency and accuracy of the search by this modification alone. The modifications also may include reducing the size of the search to some maximum pixel range from the second position or to include the second position while reducing the search in other areas of the frame. Otherwise, the modifications may include reducing the specific number of areas or samples to search within the total area to be searched. This could include reducing the number of rings to search in a concentric hierarchical search pattern or reducing the number of samples for each ring, or reducing the number of patterns and/or samples in any other search pattern.

Once the search parameters are set, the search then proceeds as normal to find matching blocks, and then once found, the motion vector indicating the motion of the block between the current frame and the reference frame is set as the motion vector for that block.

Process 800 may include "provide motion vector(s) for prediction generation" 816, and the motion vectors are then provided as usual for motion compensation to determine a prediction for each block, which are then used as candidate predictions for prediction mode selection. When the prediction of a block with a motion vector determined by directly or indirectly using the object data is selected to be used to determine and compress a residual, that motion vector is then placed in the bitstream to be used to reconstruct the frame at a decoder.

Upon the completion of the motion vector generation for the blocks forming a current object, the process 800 then may include the inquiry "more identified moving objects of frame?" 818. Also as mentioned, the identified blocks may be those that pass some criteria such as minimum size or within a certain number of objects on a frame or other criteria, and as mentioned above. If so, process 800 includes "obtain next object" 820, and loops back to operation 806 to process the blocks associated with the next object on the same frame being analyzed.

If no more identified moving objects are on a current frame, and that pass a criteria as mentioned above, process 800 continues with the inquiry "more frames?" 822. If so, the process 800 includes "obtain next frame" 824, and loops to operation 804 to obtain the object data of the next frame. If no more frames are to be analyzed, the process here ends, and encoding of the frame sequence is complete and transmitted.

Figure 9:
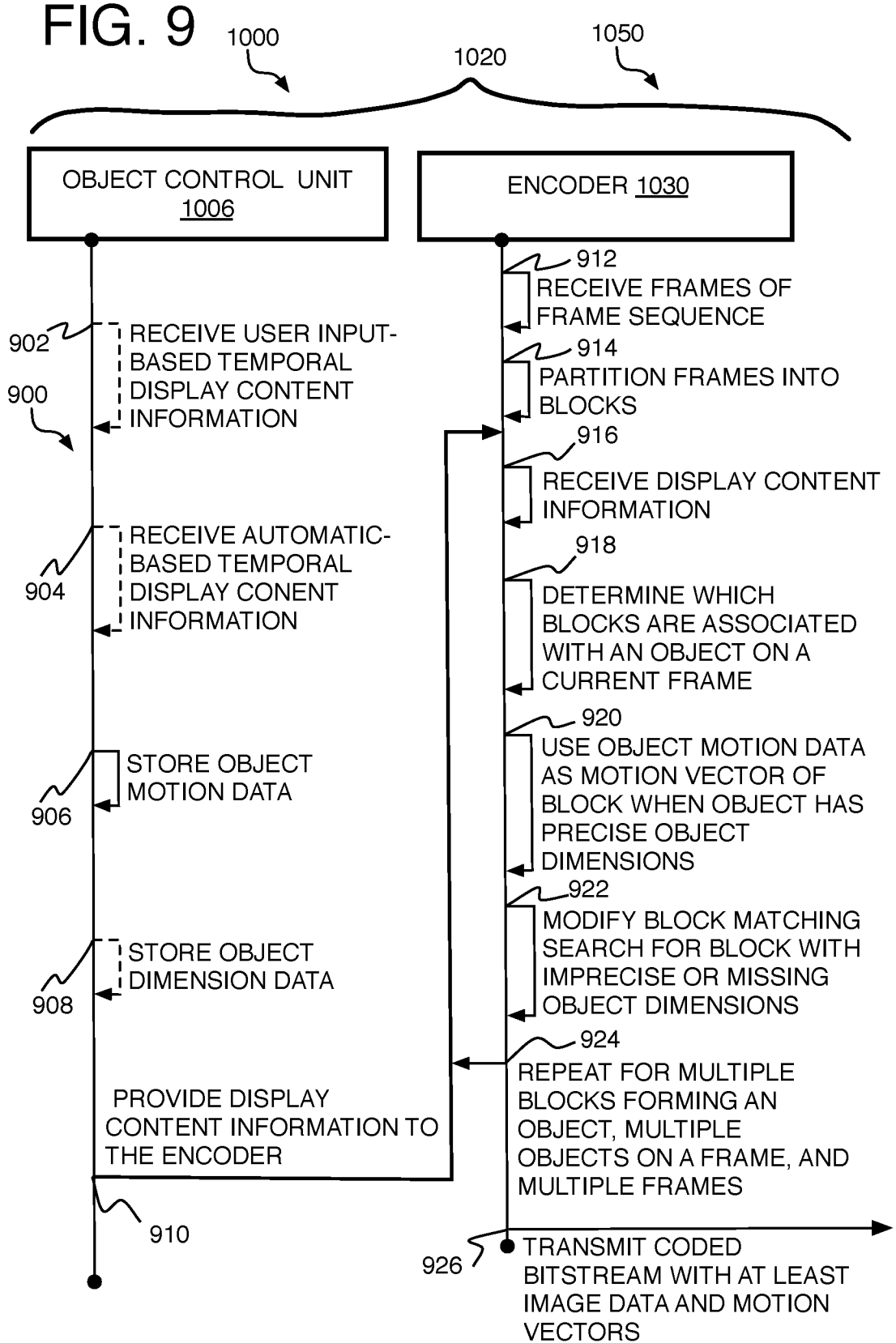
FIG. 9 is an illustrative diagram of an example system in operation for providing a method of video coding using display modification input according to the implementations herein.

Referring now to FIG. 9, a system 1000 is shown in operation of an example method 900 of video coding using display modification input. In the illustrated implementation, process 900 may include one or more operations, functions, or actions as illustrated by one or more of actions 902 to 926 generally numbered evenly, and used alternatively or in any combination. By way of non-limiting example, process 900 may be described herein with reference to operations discussed with respect to any of the implementations described herein.

Figure 10:
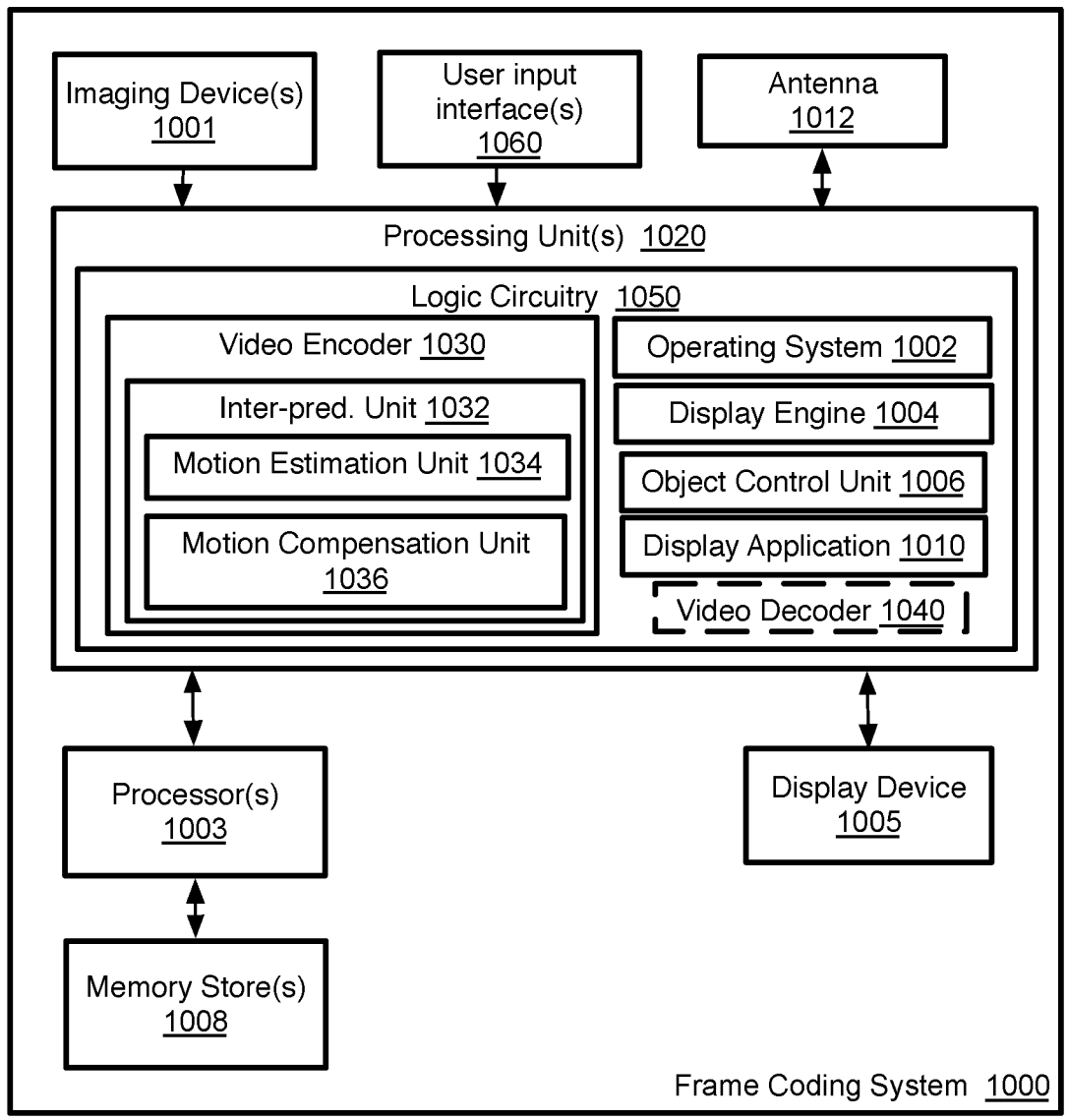
FIG. 10 is an illustrative diagram of an example system.

In the illustrated implementation, system 1000 may include a processing unit 1020 with logic units or logic circuitry or modules 1050, the like, and/or combinations thereof. For one example, logic circuitry or modules 1050 may include a number of components, the most relevant here being a video (or frame sequence) encoder 1030 with a motion estimation unit 1034, an operating system 1002, an object control unit 1006, a user input interface(s) 1060, and a display application 1010 as described herein. Although system 1000, as shown in FIG. 10, may include one particular set of operations or actions associated with particular modules, these operations or actions may be associated with different modules than the particular module illustrated here.

Process 900 may include "receive user input-based temporal display content information" 902. As explained above, this refers to receiving data that a user, using at least one of many different types of interfaces, selected object(s) on a display and generated by an application, and whether those objects were pre-defined by the application or the user performed operations including selection operations to construct and define the object. This also includes the user moving the select object or objects from one position to another position on the display, where the time it took to change the object from an initial position to a final position may have taken place over a number of frames formed by an operating system. In such a case, the operating system, via the application, determines the motion of the object from one frame to the next frame in order to display the moving object. The application can be many different display-based applications that display images to a user, and can be anything from games, word processors, graphics or presentation programs, and many others listed above.

Alternatively, or additionally, process 900 may include "receive automatic-based temporal display content information" 904, and this may include the same or similar operations mentioned above regarding the OS except here the application itself initiates and performs the motion. Examples include the computer moving in a chess game when playing against itself or a user, or any graphic art designs where the application is moving pieces or shapes around the screen such as in a screen saver program, or any other automatic presentation by the application with moving objects as described herein. Many different examples are contemplated.

Process 900 may include "store object motion data" 906, and this may include storing at least the motion of an object from one frame to another frame (such as consecutive frames but could be different). This may be in the format of coordinates of a first position, and then x and y values representing the change in position of the object from the first position to a second position. Other alternatives are contemplated here as well, as mentioned above.

Optionally, process 900 may include "store object dimension data" 908, and as mentioned, there may be a number of different ways to do this. A precise map or listing of the pixels forming the object may be provided by the application or OS, and this may include sufficient information to compute which pixels form the object (such as the start and end pixel of (or number of pixels in) each row by one possible example). Many different ways to provide such mapping or listing are contemplated. By another approach, only rough dimensions are provided whether a box generally providing the size or shape of the object or the dimensions of a hot zone that are larger than the object. The coordinates of the four corners (or corners of other shapes) that form the representation of the object may be stored. By yet another form, the shape of the object is not provided, and only the coordinates of the first and second positions (or hot spots) can be determined.

Process 900 may include "provide display content information to the encoder" 910. Both the motion data and the dimension data for the object data (also referred to generally as the temporal display content information) may be stored in tables or lists for example where it can be accessible to an encoder, and/or the motion and dimension data may be stored in a format to be added as metadata to the frames as described above. Thus, the encoder may obtain the data as needed by the encoder, or the data may be pushed to the encoder, and in one form, synchronized with the frames that are provided with the encoder so that the object data accompanies a corresponding frame (either considered the current frame or reference frame) on which the object data originates.

Process 900 may include "receive frames of frame sequence" 912. By one form, the encoder will retrieve the frames from an input buffer in re-ordered coding order (rather than display order when different).

Process 900 may continue with "partition frames into blocks" 914, where the encoder partitions the frames into slices, when so provided, and prediction blocks so that the inter and intra prediction units on the decoder loop of the encoder can form per-block predictions. As mentioned, the partitioning may depend on which coding standard is being used, and alternative partitioning, such as for alternative block sizes, may be generated to determine the best prediction modes for the blocks on a frame.

Process 900 then may include "receive display content information" 916, and where the object data is then made accessible to the encoder and may be provided upon query from the encoder or fetched by the encoder from tables or lists or other data structure in a memory, such as fetched as needed frame by frame, or otherwise the object data may be continuously fed to the encoder when a frame sequence is present, such as when the object data is provided as metadata or other data embedded into the frames.

Process 900 may include "determine which blocks are associated with an object on a current frame" 918. At this point, the encoder, during motion estimation, may compare the first position (on the current frame being predicted) of an object with the location of the blocks on the frame, and any block that is entirely within the object location, or is within object boundaries when so provided by at least a certain percentage, such as 50% or other value as discussed above, these blocks may be considered to form the object. This may be based on either precise or rough boundaries. When no object boundaries are provided, those blocks at or within a certain pixel distance of the first position coordinates of the object may be considered the blocks that form the object.

Process 900 then may include "use object motion data as motion vector of block when object has precise object dimensions" 920. Thus, when the precise dimensions and/or boundaries of the object are provided as part of the object data so that it can be determined exactly which blocks and/or pixels form the object, then those blocks that form the object are provided with a motion vector that is parallel to, and has the same distance as, the change in position, or x and y motion, of the motion data of the object.

Otherwise, process 900 then may include "modify block matching search for block with imprecise or missing object dimensions" 922. In this case, and as mentioned above, the search parameters may be modified when rough object boundaries are provided, as a hot zone for example, or when no object dimensions are provided at all. The search may be centered, or modified to cover the second position of the object (or the hot spot) on the reference frame and indicated by the object data. Other possible variations to the block search, whether to the size of the area searched or the thoroughness of the search, are described above.

Whether precise object dimensions are provided or not, the generated motion vector for the individual blocks may be provided for motion compensation as described above.

Process 900 then may include "repeat for multiple blocks forming an object, multiple objects on a frame, and multiple frames" 924. Thus, the process is then repeated for multiple or each block forming an object where the block search is omitted or modified depending on the precision of the object dimensions. This is also repeated for multiple or each object on a frame where the object data for an object is obtained from the OS, application, or object control unit for example. As mentioned, the object may meet some minimum criteria, such as size or location on a frame, to be used by the encoder. This is also repeated for each or individual frames, or other interval or types of frames such as P-frames or others mentioned above.

Otherwise, process 900 may include "transmit coded bitstream with at least image data and motion vectors" 926. The coded frame data along with the supporting or side data (or header data) then may be transmitted to a decoder including at least any motion vectors that were based directly or indirectly on the object data obtained by the encoder to modify or omit the motion estimation or block searches.

While implementation of example process 600, 700, 800, and/or 900 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 10, an example image processing system (or frame coding system) 1000 for providing video or frame sequence coding with display modification input may be arranged in accordance with at least some implementations of the present disclosure. In the illustrated implementation, system 1000 may include one or more central processing units or processors 1003 including fixed function hardware such as motion engines (MEs), processing unit(s) 1020 to provide the encoder 1030 and decoder 1040 such as those discussed herein, one or more imaging devices 1001 to capture images, an antenna 1012 to receive or transmit image data, a user input interface 1060 to receive user input to move objects as described above, a display device 1005, and one or more memory stores 1008. Processor(s) 1003, memory store 1008, and/or display device 1005 may be capable of communication with one another, via, for example, a bus, wires, or other access. In various implementations, display device 1005 may be integrated in system 1000 or implemented separately from system 1000 as with local display 302 described above.

As shown in FIG. 10, and discussed above, the processing unit 1020 may have logic circuitry 1050 with an encoder 1030 and optionally with a decoder 1040. Relevant here, the encoder 1030 may have an inter-prediction unit 1032 with a motion estimation unit 1034 and a motion compensation unit 1036. The motion estimation unit 1034 may provide the computations for any of the prediction modes or motion estimation algorithms including the hierarchical, zero, integer, or fractional motion estimation, or any others that could be used. The logic circuitry 1050 also may have an operating system 1002, a display engine 1004, an object control unit 1006 which may or may not be a part of the operating system 1002, and a display application such as those described above that can provide images for display. As mentioned above, it will be understood that the code of the object control unit may or may not be separate from the code of the other units. These units of the logic circuitry 1050 provide many of the functions described herein and as explained with the processes described above.

As will be appreciated, the modules illustrated in FIG. 10 may include a variety of software and/or hardware modules and/or modules that may be implemented via software or hardware or combinations thereof. For example, the modules may be implemented as software via processing units 1020 or the modules may be implemented via a dedicated hardware portion. Also, system 1000 may be implemented in a variety of ways. For example, system 1000 (excluding display device 1005) may be implemented as a single chip or device having an accelerator or a graphics processor unit (GPU) which may or may not have image signal processors (ISPs), a quad-core central processing unit, and/or a memory controller input/output (I/O) module. In other examples, system 1000 (again excluding display device 1005) may be implemented as a chipset or a system on a chip (SoC). It will be understood antenna 1012 could be used to receive image data for encoding as well.

Otherwise, processor(s) 1003 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like. The implementation is not limited as long as kernels used to perform video coding prediction tasks can use software, firmware, and/or hardware to run on execution units that can call fixed function hardware such as the MEs to efficiently perform repetitive computations such as for block-matching or spatial dependency calculations, or other tasks, and consistent with the description above. The motion engines may be in the form of a block in the hardware whether dedicated or not for this purpose. This may be placed in the graphics hardware, or could be a discrete GPU.

In addition, memory stores 1008 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1008 also may be implemented via cache memory.

In various implementations, the example video coding system 1000 may use the imaging device 1001, when so provided, to form or receive captured image data. This can be implemented in various ways. Thus, in one form, the image processing system 1000 may be one or more digital cameras or other image capture devices, and imaging device 1001, in this case, may be the camera hardware and camera sensor software, module, or component 1050. In other examples, video coding system 1000 may have an imaging device 1001 that includes or may be one or more cameras, and logic modules 1050 may communicate remotely with, or otherwise may be communicatively coupled to, the imaging device 1001 for further processing of the image data.

Thus, video coding system 1000 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1001 may include camera hardware and optics including one or more sensors as well as auto-focus, zoom, aperture, ND-filter, auto-exposure, flash, and actuator controls. The imaging device 1001 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1001 may be provided with an eye tracking camera. Otherwise, the imaging device 1001 may be any other device that records, displays or processes digital images such as video game panels or consoles, set top boxes, and so forth.

As illustrated, any of these components may be capable of communication with one another and/or communication with portions of logic modules 1050 and/or imaging device 1001. Thus, processors 1003 may be communicatively coupled to both the image device 1001 and the logic modules 1050 for operating those components. Although image processing system 1000, as shown in FIG. 10, may include one particular set of blocks or actions associated with particular components or modules, these blocks or actions may be associated with different components or modules than the particular component or module illustrated here.

Figure 11:
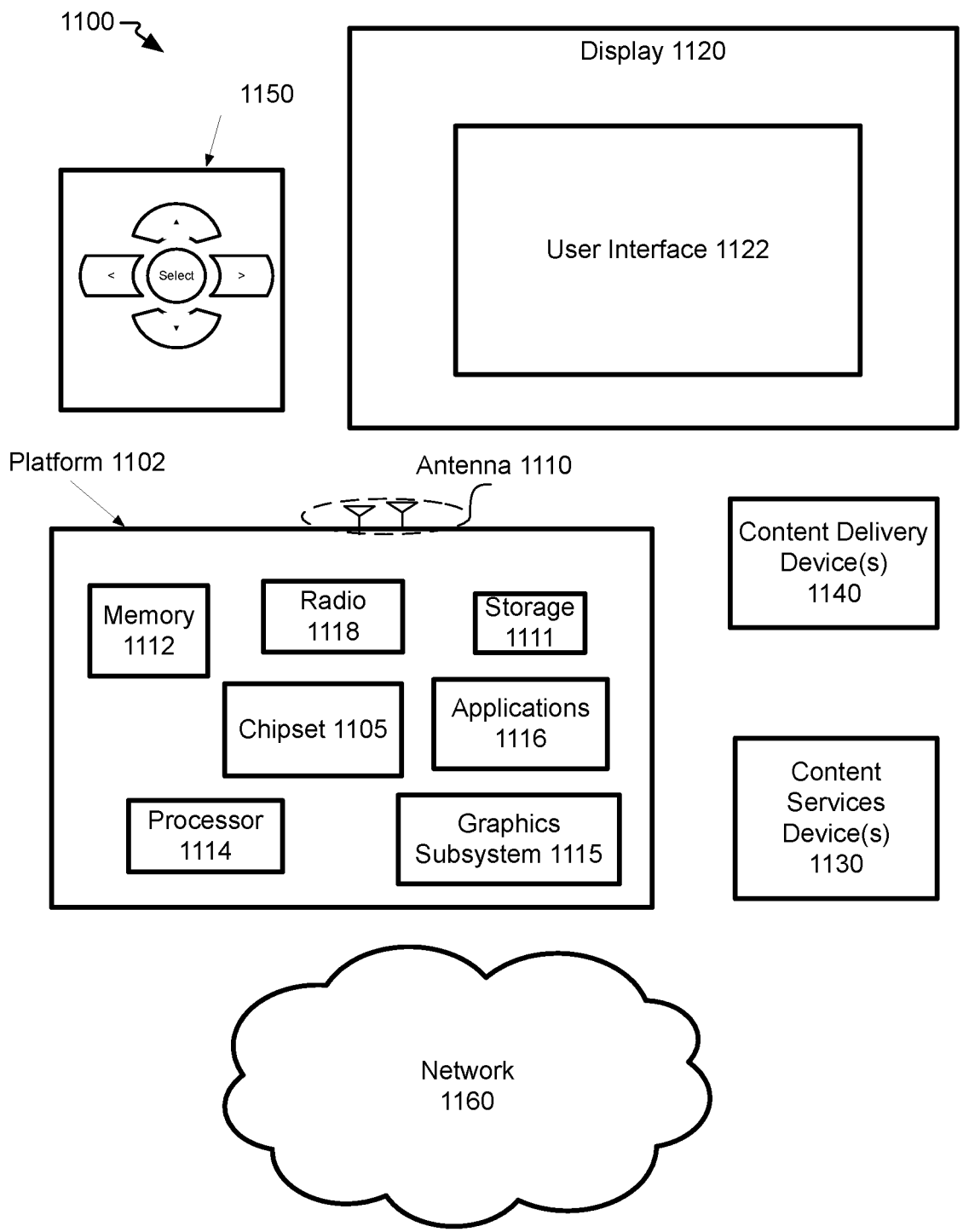
FIG. 11 is an illustrative diagram of another example system.

Referring to FIG. 11, an example system 1100 in accordance with the present disclosure and various implementations may embody system 1000 for example, and may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 communicatively coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118 as well as antenna(s) 1111. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
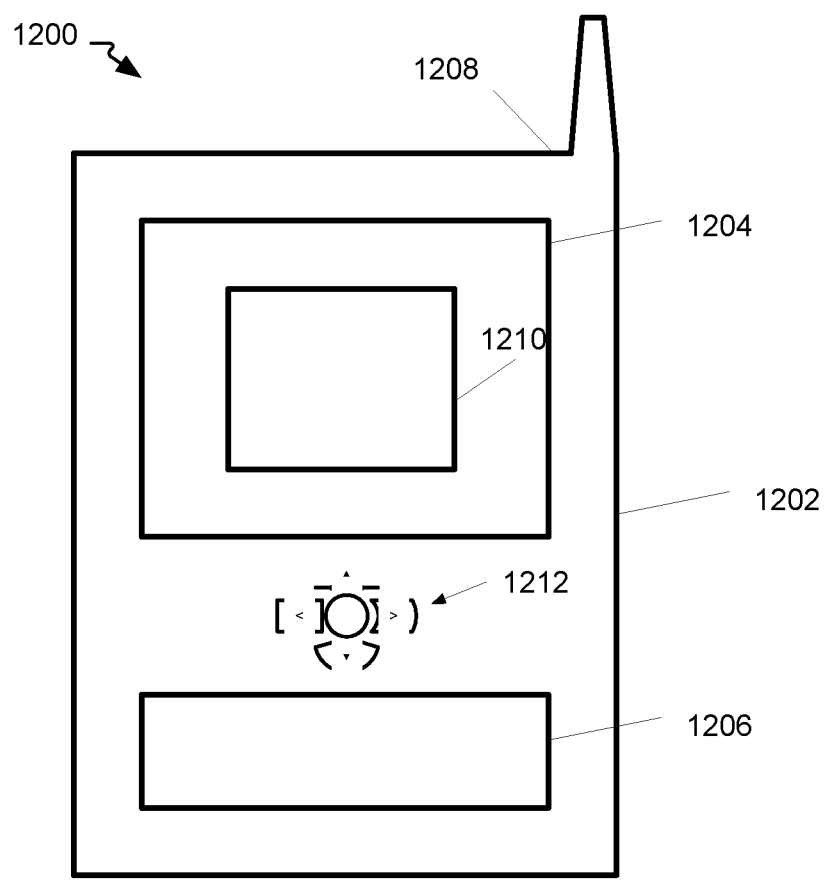
FIG. 12 illustrates another example device, all arranged in accordance with at least some implementations of the present disclosure.

As described above, system 1000 or 1100 may be implemented in varying physical styles or form factors. FIG. 12 illustrates implementations of a small form factor device 1200 in which system 1000 or 1100 may be implemented. In implementations, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable screen 1210 on a display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method of video coding obtaining temporal display content information of image data of frames of a frame sequence and comprising object data of at least one object being moved from frame to frame due to user or automatic input to an application providing the temporal display content information, wherein the at least one object is defined before encoding and for at least one reason that is not solely for encoding; obtaining pixel image data of the frames to encode the frame sequence; and determining at least one motion vector associated with the at least one object based, at least in part, on the temporal display content information.

The method also may include wherein the object data comprises at least: a first object position on a frame, and at least one of: (1) coordinates of a second object position on another frame, and of the object having the first object position, (2) x and y coordinates of the difference between the coordinates of the first and second object positions, and (3) a motion direction value and a motion distance value from the first object position to the second object position; wherein the object data comprises dimensions of the object and to be used to determine which pixels form the object; wherein the object data comprises motion data of at least one object moved on a frame in response to a user entering motion commands via at least one of a mouse, keyboard, touchscreen, touchpad, track ball, pointing stick, game controller, microphone, and motion detector. The method comprising wherein the object data comprises motion data of at least one object moved on a frame in response to an automatic input to an application that generated the automatic input and in response to at least one of: initial activation of the application, an input by the user, or an event on the display caused by the application; wherein at least one of: (1) the object data is considered to be embedded in the frames and accompanies the frames as provided to the encoder, and (2) the encoder obtains the object data from an object data table or list in a memory; the method determining which one or more blocks of a current frame form the at least one object; and individually providing the blocks that form the at least one object with a motion vector depending on the object data of the at least one object; forming the motion vector of a block without performing a block matching search on a reference frame; omitting the block matching search when the object data comprises data that indicates which pixels form the object; modifying at least one parameter of a block matching search on a reference frame to determine a motion vector for the individual blocks; wherein the search is modified when the object data does not provide an indication of the location of all pixels that form the object; wherein the search is modified by at least one of: reducing the area covered by the search, reducing the number of sample points tested by the search, and moving the search over or near a position indicated as an object position by the object data; wherein the search is modified based, at least in part, on a hot zone near a pixel location on a frame that was selected by a user, wherein the dimensions of the hot zone are determined, at least in part, by an operating system or a display-based application providing the object data; wherein the search is limited to within or near boundaries set as the hot zone boundaries.

The method also may be comprising: obtaining the object data based on user input formed by a user selecting at least one object on a hot zone on a display, wherein the hot zone is determined by an operating system and relative to the object on the display; modifying a search for matching blocks between a reference frame and a current frame by limiting the search to near or within the hot zone; determining a motion vector of individual blocks on the current frame at the hot zone and to be used to determine a prediction mode of the individual blocks, and placing the motion vector in a bitstream with encoded data of the individual blocks and to be used to decode the encoded data.

By another approach, a computer-implemented system comprises at least one display; at least one memory to store frames of a video sequence and object data of at least one object on the frames; at least one processor communicatively coupled to the at least one of the memory and display; and an encoder operated by the at least one processor and operated by: obtaining temporal display content information of image data of frames of a frame sequence and comprising the object data wherein the object data is of at least one object being moved from frame to frame due to user or automatic input to an application providing the temporal display content information, wherein the at least one object is defined before encoding and for at least one reason that is not solely for encoding; obtaining pixel image data of the frames to encode the frame sequence; and determining at least one motion vector associated with the at least one object based, at least in part, on the temporal display content information.

The system also may include wherein the object data comprises at least: a first object position on a frame, and at least one of: (1) coordinates of a second object position on another frame, and of the object having the first object position, (2) x and y coordinates of the difference between the coordinates of the first and second object positions, and (3) a motion direction value and a motion distance value from the first object position to the second object position; wherein the object data comprises an identification of which frame the object is on, and shape data indicating the dimensions of the object sufficient to determine which pixels form the object; wherein the object data comprises sufficient dimensions of the object to determine which pixels form the object; and the encoder operating by omitting the search for a motion vector and using the motion data of the object data as the motion vector of the blocks found to be at the object; wherein the encoder operates by modifying a search for motion vectors of blocks at the object when the object data does not provide an indication of the location of all pixels that form the object; and wherein the search is modified by at least one of: reducing the area covered by the search, reducing the number of sample points tested by the search, and moving the search over or near a position indicated as an object position by the object data; wherein the object data is at least one of: considered to be embedded in the frames and accompanies the frames as provided to the encoder, and stored on an object data table in a memory.

The system also may include wherein the encoder operates by obtaining the object data based on user input formed by a user selecting at least one object on a hot zone on a display, wherein the hot zone is determined by an operating system and relative to the object on the display; modifying a search for matching blocks between a reference frame and a current frame by limiting the search to near or within the hot zone; determining a motion vector of individual blocks on the current frame at the hot zone and to be used to determine a prediction mode of the individual blocks, and placing the motion vector in a bitstream with encoded data of the individual blocks and to be used to decode the encoded data.

By another implementation, a computer-readable medium having stored thereon instructions that when executed cause a computing device to operate by: obtaining temporal display content information of image data of frames of a frame sequence and comprising object data of at least one object being moved from frame to frame due to user or automatic input to an application providing the temporal display content information, wherein the at least one object is defined before encoding and for at least one reason that is not solely for encoding; obtaining pixel image data of the frames to encode the frame sequence; and determining at least one motion vector associated with the at least one object based, at least in part, on the temporal display content information.

The computer-readable medium wherein the object data comprises at least: a first object position on a frame, and at least one of: (1) coordinates of a second object position on another frame, and of the object having the first object position, (2) x and y coordinates of the difference between the coordinates of the first and second object positions, and (3) a motion direction value and a motion distance value from the first object position to the second object position; wherein the object data comprises dimensions of the object and to be used to determine which pixels form the object; wherein the object data comprises motion data of at least one object moved on a frame in response to a user entering motion commands via at least one of a mouse, keyboard, touchscreen, touchpad, track ball, pointing stick, game controller, microphone, and motion detector; wherein the object data comprises motion data of at least one object moved on a frame in response to an automatic input to an application that generated the automatic input and in response to at least one of: initial activation of the application, an input by the user, or an event on the display caused by the application; wherein at least one of: (1) the object data is considered to be embedded in the frames and accompanies the frames as provided to the encoder, and (2) the encoder obtains the object data from an object data table or list in a memory; the instructions causing the computing device to operate by determining which one or more blocks of a current frame form the at least one object; and individually providing the blocks that form the at least one object with a motion vector depending on the object data of the at least one object; forming the motion vector of a block without performing a block matching search on a reference frame; omitting the block matching search when the object data comprises data that indicates which pixels form the object; modifying at least one parameter of a block matching search on a reference frame to determine a motion vector for the individual blocks; wherein the search is modified when the object data does not provide an indication of the location of all pixels that form the object; wherein the search is modified by at least one of: reducing the area covered by the search, reducing the number of sample points tested by the search, and moving the search over or near a position indicated as an object position by the object data; wherein the search is modified based, at least in part, on a hot zone near a pixel location on a frame that was selected by a user, wherein the dimensions of the hot zone are determined, at least in part, by an operating system or a display-based application providing the object data; wherein the search is limited to within or near boundaries set as the hot zone boundaries.

The instructions causing the computing device to operate by obtaining the object data based on user input formed by a user selecting at least one object on a hot zone on a display, wherein the hot zone is determined by an operating system and relative to the object on the display; modifying a search for matching blocks between a reference frame and a current frame by limiting the search to near or within the hot zone; determining a motion vector of individual blocks on the current frame at the hot zone and to be used to determine a prediction mode of the individual blocks, and placing the motion vector in a bitstream with encoded data of the individual blocks and to be used to decode the encoded data.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
    obtaining temporal display content information of image data of frames of a frame sequence and comprising object data of at least one object being moved from frame to frame along the sequence due to user or automatic input to an application providing the temporal display content information so that the temporal display content information is more than color-related or brightness-related pixel image data values alone, and wherein the at least one object is defined before encoding and the temporal display content information is formed before encoding and for at least one reason that is not solely for encoding;
    obtaining pixel image data of the frames to encode the frame sequence; and encoding the pixel image data comprising determining at least one motion vector to be used to compress the pixel image data of the at least one object and to transmit at least one frame of the frame sequence with the pixel image data, wherein the at least one motion vector indicates motion of at least part of the at least one object, and wherein the determining comprises either modifying or omitting a block matching search depending, at least in part, on the temporal display content information.

2. The method of claim 1 wherein the object data comprises at least: a first object position on a frame, and at least one of:
    (1) coordinates of a second object position on another frame, and of the object having the first object position,
    (2) x and y coordinates of the difference between the coordinates of the first and second object positions, and
    (3) a motion direction value and a motion distance value from the first object position to the second object position.

3. The method of claim 1 wherein the object data comprises dimensions of the object and to be used to determine which pixels form the object.

4. The method of claim 1 wherein the object data comprises motion data of at least one object moved on a frame in response to a user entering motion commands via at least one of a mouse, keyboard, touchscreen, touchpad, track ball, pointing stick, game controller, microphone, and motion detector.

5. The method of claim 1 comprising wherein the object data comprises motion data of at least one object moved on a frame in response to an automatic input to an application that generated the automatic input and in response to at least one of: initial activation of the application, an input by the user, or an event on the display caused by the application.

6. The method of claim 1 wherein the object data is embedded in metadata of the frames and accompanies the frames as provided to the encoder.

7. The method of claim 1 wherein the encoder obtains the object data from an object data table or list in a memory.

8. The method of claim 1 comprising partitioning frames into blocks in order to encode the frames; determining which one or more of the blocks of a current frame form the at least one object; and individually providing the blocks that form the at least one object with a motion vector depending on the object data of the at least one object.

9. The method of claim 8 comprising forming the motion vector of a block without performing a block matching search on a reference frame.

10. The method of claim 9 comprising omitting the block matching when the object data comprises data that indicates which pixels form the object.

11. The method of claim 8 comprising modifying at least one parameter of a block matching search on a reference frame to determine a motion vector for the individual blocks.

12. The method of claim 11 wherein the search is modified when the object data does not provide an indication of the location of all pixels that form the object.

13. The method of claim 11 wherein the search is modified by at least one of:
reducing the area covered by the search,
reducing the number of sample points tested by the search, and
moving the search over or near a position indicated as an object position by the object data.

14. The method of claim 11 wherein the search is modified based, at least in part, on a hot zone near a pixel location on a frame that was selected by a user, wherein the dimensions of the hot zone are determined, at least in part, by an operating system or a display-based application providing the object data.

15. The method of claim 14 wherein the search is limited to within or near boundaries set as the hot zone boundaries.

16. The method of claim 1 comprising:
obtaining the object data based on user input formed by a user selecting at least one object on a hot zone on a display, wherein the hot zone is determined by an operating system and relative to the object on the display;
modifying a search for matching blocks between a reference frame and a current frame by limiting the search to near or within the hot zone;
determining a motion vector of individual blocks on the current frame at the hot zone and to be used to determine a prediction mode of the individual blocks, and
placing the motion vector in a bitstream with encoded data of the individual blocks and to be used to decode the encoded data.

17. A computer-implemented system comprising:
at least one display;
at least one memory to store frames of a video sequence and object data of at least one object on the frames;
at least one processor communicatively coupled to the at least one of the memory and display; and
an encoder operated by the at least one processor and operated by:
obtaining temporal display content information of image data of frames of a frame sequence and comprising object data of at least one object being moved from frame to frame along the sequence due to user or automatic input to an application providing the temporal display content information so that the temporal display content information is more than color-related or brightness-related pixel image data values alone, and wherein the at least one object is defined before encoding and the temporal display content information is formed before encoding and for at least one reason that is not solely for encoding;
obtaining pixel image data of the frames to encode the frame sequence; and encoding the pixel image data comprising determining at least one motion vector to be used to compress the pixel image data of the at least one object and to transmit at least one frame of the frame sequence with the pixel image data, wherein the at least one motion vector indicates motion of at least part of the at least one object, and wherein the determining comprises either modifying or omitting a block matching search depending, at least in part, on the temporal display content information.

18. The system of claim 17 wherein the object data comprises at least:
a first object position on a frame, and at least one of:
(1) coordinates of a second object position on another frame, and of the object having the first object position,
(2) x and y coordinates of the difference between the coordinates of the first and second object positions, and
(3) a motion direction value and a motion distance value from the first object position to the second object position.

19. The system of claim 17 wherein the object data comprises an identification of which frame the object is on, and shape data indicating the dimensions of the object sufficient to determine which pixels form the object.

20. The system of claim 17 wherein the object data comprises sufficient dimensions of the object to determine which pixels form the object; and the encoder operating by omitting the search for a motion vector and using the motion data of the object data as the motion vector of the blocks found to be at the object.

21. The system of claim 17 wherein the encoder operates by modifying a search for motion vectors of blocks at the object when the object data does not provide an indication of the location of all pixels that form the object; and wherein the search is modified by at least one of:
reducing the area covered by the search,
reducing the number of sample points tested by the search, and
moving the search over or near a position indicated as an object position by the object data.

22. The system of claim 17 wherein the object data is at least one of: embedded in metadata of the frames and accompanies the frames as provided to the encoder, and stored on an object data table in a memory.

23. The system of claim 17 wherein the encoder operates by obtaining the object data based on user input formed by a user selecting at least one object on a hot zone on a display, wherein the hot zone is determined by an operating system and relative to the object on the display;
modifying a search for matching blocks between a reference frame and a current frame by limiting the search to near or within the hot zone;
determining a motion vector of individual blocks on the current frame at the hot zone and to be used to determine a prediction mode of the individual blocks, and
placing the motion vector in a bitstream with encoded data of the individual blocks and to be used to decode the encoded data.

24. A Non Transitory computer-readable medium having stored thereon instructions that when executed cause a computing device to operate by:
obtaining temporal display content information of image data of frames of a frame sequence and comprising object data of at least one object being moved from frame to frame along the sequence due to user or automatic input to an application providing the temporal display content information so that the temporal display content information is more than color-related or brightness-related pixel image data values alone, and wherein the at least one object is defined before encoding and the temporal display content information is formed before encoding and for at least one reason that is not solely for encoding;

obtaining pixel image data of the frames to encode the frame sequence; and encoding the pixel image data comprising determining at least one motion vector to be used to compress the pixel image data of the at least one object and to transmit at least one frame of the frame sequence with the pixel image data, wherein the at least one motion vector indicates motion of at least part of the at least one object, and wherein the determining comprises either modifying or omitting a block matching search depending, at least in part, on the temporal display content information.

25. The Non Transitory computer-readable medium of claim 24 wherein the instructions cause the computing device to operate by:

obtaining the object data based on user input formed by a user selecting at least one object on a hot zone on a display, wherein the hot zone is determined by an operating system and relative to the object on the display;

modifying a search for matching blocks between a reference frame and a current frame by limiting the search to near or within the hot zone;

determining a motion vector of individual blocks on the current frame at the hot zone and to be used to determine a prediction mode of the individual blocks, and placing the motion vector in a bitstream with encoded data of the individual blocks and to be used to decode the encoded data.

* * * * *